US 8,773,715 B2

(12) United States Patent
Katayama et al.

(10) Patent No.: US 8,773,715 B2
(45) Date of Patent: Jul. 8, 2014

(54) COLOR SELECTION ASSISTING METHOD, IMAGE PROCESSING METHOD, COLOR SELECTION ASSISTING APPARATUS, IMAGE PROCESSING APPARATUS, AND RECORDING MEDIUM

(75) Inventors: Takeshi Katayama, Tokyo (JP); Eiji Teraue, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 247 days.

(21) Appl. No.: 13/237,504

(22) Filed: Sep. 20, 2011

(65) Prior Publication Data

US 2012/0075645 A1 Mar. 29, 2012

(30) Foreign Application Priority Data

Sep. 27, 2010 (JP) ................................. 2010-214694

(51) Int. Cl.
*H04N 1/60* (2006.01)
(52) U.S. Cl.
USPC ............ 358/1.9; 358/406; 358/504; 345/594; 399/49
(58) Field of Classification Search
USPC .................. 358/1.9, 406, 504, 518, 523, 524; 399/49; 345/593, 594
See application file for complete search history.

(56) References Cited

U.S. PATENT DOCUMENTS

| 6,215,562 B1 * | 4/2001 | Michel et al. ................... 358/1.9 |
| 6,381,036 B1 * | 4/2002 | Olson ............................ 358/1.9 |
| 7,239,402 B2 | 7/2007 | Soler et al. |
| 7,539,428 B2 * | 5/2009 | Yamada .......................... 399/49 |
| 8,049,926 B2 * | 11/2011 | Hayward et al. ............... 358/1.9 |
| 8,289,576 B2 * | 10/2012 | Agehama ........................ 358/1.9 |
| 8,305,664 B2 * | 11/2012 | Yasunaga ...................... 358/518 |
| 8,335,013 B2 * | 12/2012 | Quach ............................ 358/1.9 |
| 2005/0206928 A1 * | 9/2005 | Itagaki ............................ 358/1.9 |
| 2007/0133061 A1 * | 6/2007 | Bang et al. ................... 358/3.26 |
| 2007/0153340 A1 * | 7/2007 | Itagaki et al. ................. 358/504 |
| 2007/0176942 A1 * | 8/2007 | Itagaki et al. ................. 345/589 |
| 2007/0177237 A1 * | 8/2007 | Sasanuma et al. ............ 358/518 |
| 2007/0182996 A1 * | 8/2007 | Nakajima .................... 358/3.13 |
| 2007/0188782 A1 | 8/2007 | Sakurai |
| 2009/0059322 A1 * | 3/2009 | Vanduyn et al. .............. 358/504 |
| 2009/0091771 A1 * | 4/2009 | Kuhn et al. ..................... 358/1.9 |
| 2010/0201998 A1 * | 8/2010 | Quach ............................ 358/1.9 |
| 2010/0277751 A1 * | 11/2010 | Quach ............................ 358/1.9 |

FOREIGN PATENT DOCUMENTS

| JP | 2000-217007 A | 8/2000 |
| JP | 2002-351447 A | 12/2002 |
| JP | 2003-134349 A | 5/2003 |

OTHER PUBLICATIONS

Extended European Search Report, dated Mar. 7, 2014, issued in corresponding European Patent Application No. 11182320.9.

* cited by examiner

*Primary Examiner* — Kimberly A Williams
(74) *Attorney, Agent, or Firm* — Birch, Stewart, Kolasch & Birch, LLP

(57) ABSTRACT

At least one color patch, which is extracted as a candidate patch from within a color chart, is colorimetrically measured and a color value is acquired. Based on a color value of a designated color to be reproduced on a print and a color value of the candidate patch, a corresponding position on the color chart responsive to the color value of the designated color is calculated. Instruction mark images indicative of the calculated corresponding position are displayed respectively, together with a simulating image, in which a layout of multiple color patches on the color chart is simulated.

15 Claims, 17 Drawing Sheets

|  | (1') | (0') | (-1') | (1) | (0) | (-1) | (1") | (0") | (-1") |
|---|---|---|---|---|---|---|---|---|---|
| (1) | +1 | +1 | +1 | 0 | 0 | 0 | -1 | -1 | -1 |
|  | +1 | 0 | -1 | +1 | 0 | -1 | +1 | 0 | -1 |
|  | +1 | +1 | +1 | +1 | +1 | +1 | +1 | +1 | +1 |
| (0) | +1 | +1 | +1 | 0 | 0 | 0 | -1 | -1 | -1 |
|  | +1 | 0 | -1 | +1 | 0 | -1 | +1 | 0 | -1 |
|  | 0 | 0 | 0 | 0 | 0 | 0 | 0 | 0 | 0 |
| (-1) | +1 | +1 | +1 | 0 | 0 | 0 | -1 | -1 | -1 |
|  | +1 | 0 | -1 | +1 | 0 | -1 | +1 | 0 | -1 |
|  | -1 | -1 | -1 | -1 | -1 | -1 | -1 | -1 | -1 |

| POSITION | L* | | a* | | b* | | Δe |
|---|---|---|---|---|---|---|---|
| | COLOR VALUE | DIRECTION | COLOR VALUE | DIRECTION | COLOR VALUE | DIRECTION | |
| P1 | 35.89 | ← | 8.12 | → | -41.6 | ↓ | 5.79 |
| P2 | 40.89 | → | 8.12 | → | -41.6 | ↓ | 5.83 |
| P3 | 40.89 | → | 3.12 | ← | -41.6 | ↓ | 6.06 |
| P4 | 40.89 | → | 3.12 | ← | -41.6 | ↑ | 3.77 |

COLOR SELECTION ASSISTING METHOD, IMAGE PROCESSING METHOD, COLOR SELECTION ASSISTING APPARATUS, IMAGE PROCESSING APPARATUS, AND RECORDING MEDIUM

CROSS-REFERENCE TO RELATED APPLICATION

This application is based upon and claims the benefit of priority from Japanese Patent Application No. 2010-214694 filed on Sep. 27, 2010, of which the contents are incorporated herein by reference.

BACKGROUND OF THE INVENTION

1. Field of the Invention

The present invention relates to a color selection assisting method, an image processing method, a color selection assisting apparatus, an image processing apparatus, and a recording medium having a program recorded therein for determining a standard color, printing a color chart that has a plurality of color patches including neighboring colors of the standard color, and thereafter allowing an operator to select from the color chart at least one of the color patches, which has a color close to a designated color that is reproduced on a print.

2. Description of the Related Art

With significant advances in inkjet technology in recent years, it is becoming possible for inkjet printers to produce large color prints of high quality at high speeds. Inkjet printers are not only popular for private or home use, but also are widely used for public use or in commercial applications nowadays. Inkjet printers make it possible to print on POP (Point Of Purchase) posters, wall posters, large-size mediums such as outdoor advertisements and billboards, roll mediums, and thick hard mediums.

Since advertisement prints are expected to be effective to arouse consumers' motivation to buy advertised products through visual sensation, the finish of colors in such prints is of particular importance. Heretofore, there have been disclosed various color matching technologies, such as a method of generating an ICC (International Color Consortium) profile, a method of adjusting a spot color (hereinafter referred to as a "designated color"), etc., as print color managing means.

A method of adjusting a designated color includes making fine adjustments of the color of an area of interest in a color image in order to bring the color into substantial conformity with a designated color to be reproduced on a print, using color samples such as color chips, etc. More specifically, actual color values of a color sample and color values for reproducing the designated color with a printing machine are acquired, and a print color is corrected based on the difference between the acquired color values.

Japanese Laid-Open Patent Publication No. 2003-134349 (paragraph [0009], FIG. 4) discloses a method of reading a color sample with a scanner device, printing a plurality of variations of the color sample generated from the read data, and selecting a particular color from the printed variations.

Japanese Laid-Open Patent Publication No. 2000-217007 (paragraphs [0034] through [0036], FIGS. 4 and 5) discloses a method of setting a display device to display a designated color on a screen image (display window), visually observing a printed color chart, selecting a color closest to the designated color from color patches provided in twenty-seven colors, and entering a number of the selected color through the screen image. The patent publication states that it is possible to cause the designated color displayed on the display device and a color printed by a printing machine to strictly approximate to each other.

Japanese Laid-Open Patent Publication No. 2002-351447 (paragraph [0004], FIGS. 1 and 2) discloses a system for selecting a desired color using in combination a display device and a printing machine. More specifically, a color wheel (succession of colors) is displayed on a first screen image of the display device, thereby allowing the operator to select colors in general. Then, a window (discrete colors) is displayed on a second screen image of the display device, in order to allow the operator to select an accurate color based on a printing result produced by the printing machine.

SUMMARY OF THE INVENTION

In order to strictly reproduce a designated color on a print according to the methods of the related art discussed above, it is necessary to repeat steps of printing a color chart and selecting a color patch.

However, as the color intervals between respective color patches are made smaller, the operator finds it more difficult to identify, with good reproducibility, the similarity or proximity between the color patches and the color samples.

Consequently, a method has been adopted in which, by colorimetrically measuring the color patches using a colorimeter, a color patch is selected having a smallest color difference with the designated color. However, in this case, in order to identify a color patch having the smallest color difference, it is necessary for the operator to colorimetrically measure all of the color patches on the color chart, and to carry out respective calculations to determine color differences between the color patches and the designated color. As a result, the number of process steps and man-hours increases, and the operator often cannot cope with such difficulties.

An object of the present invention is to provide a color selection assisting method, an image processing method, a color selection assisting apparatus, an image processing apparatus, and a recording medium having a program recorded therein, which overcome the aforementioned problems, and which enable an operator to select with good efficiency a color that is close to a designated color. According to the present invention, there is provided a color selection assisting method for determining a standard color, and assisting an operator in selecting, from within a color chart that has a plurality of color patches including colors in the vicinity of the standard color, at least one color patch that is close in color to a designated color to be reproduced on a print, comprising a color value acquiring step of acquiring a color value of the designated color, a colorimetric measuring step of colorimetrically measuring at least one color patch extracted as a candidate patch from within the color chart, and acquiring a color value of the candidate patch, a calculation step of calculating, based on the acquired color value of the designated color and the acquired color value of the candidate patch, a corresponding position on the color chart corresponding to the color value of the designated color, and a displaying step of displaying respectively, together with a simulating image in which a layout of the plurality of color patches on the color chart is simulated, an instruction mark image indicative of the calculated corresponding position.

The displaying step preferably classifies respective color components of the color value, and displays the instruction mark images respectively therefor.

Preferably, the instruction mark image is an image showing a direction from a position at which the candidate patch is disposed to the corresponding position.

The colorimetric measuring step preferably further comprises acquiring the color value of the candidate patch corresponding with the position at which the candidate patch is disposed on the color chart.

Preferably, the instruction mark image is an image showing a range within which the corresponding position exists, and the displaying step superimposes the instruction mark image on the simulating image.

Preferably, a plurality of measurement patches, which are arranged on a common line and having colors of a plurality of predetermined candidate patches, are provided on the color chart.

The color selection assisting method preferably further comprises an inputting step of inputting, responsive to an operation of the operator, identification information of the extracted candidate patch, wherein, based on the input identification information, the colorimetric measuring step further comprises acquiring the color value of the candidate patch corresponding with the position at which the candidate patch is disposed on the color chart.

The color selection assisting method preferably further comprises a modifying step of modifying at least one of: number of the extracted candidate patches; a position at which one of the candidate patches is disposed; and an order in which the color values of the candidate patches are acquired.

Preferably, the color value acquiring step acquires the color value of the designated color using a colorimeter, which is the same as the colorimeter used in the colorimetric measuring step.

The color selection assisting method preferably further comprises a step of acquiring a selected color value, which is a color value corresponding to the color patch selected as representing a color that is closest to the designated color.

An image processing method according to the present invention comprises a printing step of determining a standard color, and printing a color chart that has a plurality of color patches including colors in the vicinity of the standard color, a colorimetric measuring step of colorimetrically measuring at least one color patch extracted as a candidate patch from within the color chart, and acquiring a color value of the candidate patch, a calculation step of calculating, based on a color value of a designated color to be reproduced on a print and the color value of the candidate patch, a corresponding position on the color chart corresponding to the color value of the designated color, and a displaying step of displaying respectively, together with a simulating image in which a layout of the plurality of color patches on the color chart is simulated, an instruction mark image indicative of the calculated corresponding position, an acquiring step of acquiring a selected color value, which is a color value corresponding to a color patch selected as representing a color that is closest to the designated color, and a color adjusting step of adjusting a color of the print to be printed, based on the acquired selected color value and the color value of the designated color.

A color selection assisting apparatus according to the present invention operates for determining a standard color, and assisting an operator in selecting, from within a color chart that has a plurality of color patches including colors in the vicinity of the standard color, at least one color patch that is close in color to a designated color to be reproduced on a print. The color selection assisting apparatus comprises a colorimeter for colorimetrically measuring at least one color patch extracted as a candidate patch from within the color chart, and acquiring a color value of the candidate patch, a corresponding position calculator for calculating, based on a color value of the designated color and the color value of the candidate patch acquired by the colorimeter, a corresponding position on the color chart corresponding to the color value of the designated color, and a display unit for displaying respectively, together with a simulating image in which a layout of the plurality of color patches on the color chart is simulated, an instruction mark image indicative of the corresponding position calculated by the corresponding position calculator.

The color selection assisting apparatus preferably further comprises a selected color value acquirer for acquiring a selected color value, which is a color value corresponding to a color patch selected as representing a color that is closest to the designated color, wherein the display unit displays color information related to the selected color value acquired by the selected color value acquirer.

The color selection assisting apparatus preferably further comprises a data converter for converting the selected color value into device-dependent data for a printing machine that prints the print, using a profile of the printing machine, wherein the display unit displays the device-dependent data converted by the data converter.

An image processing apparatus according to the present invention operates for determining a standard color, and assisting an operator in selecting, from within a color chart that has a plurality of color patches including colors in the vicinity of the standard color, at least one color patch that is close in color to a designated color to be reproduced on a print. The image processing apparatus comprises a colorimeter for colorimetrically measuring at least one color patch extracted as a candidate patch from within the color chart, and acquiring a color value of the candidate patch, a corresponding position calculator for calculating, based on a color value of the designated color and the color value of the candidate patch acquired by the colorimeter, a corresponding position on the color chart corresponding to the color value of the designated color, a display unit for displaying respectively, together with a simulating image in which a layout of the plurality of color patches on the color chart is simulated, an instruction mark image indicative of the corresponding position calculated by the corresponding position calculator, a first color value acquirer for acquiring a first color value, which is a color value corresponding to a color patch selected as representing a color that is closest to the designated color, a second color value acquirer for acquiring a second color value, which is a color value of the designated color, and a print color adjuster for adjusting a color of the print to be printed, based on the first color value acquired by the first color value acquirer and the second color value acquired by the second color value acquirer.

A recording medium according to the present invention stores therein a program for determining a standard color, and assisting an operator in selecting, from within a color chart that has a plurality of color patches including colors in the vicinity of the standard color, at least one color patch that is close in color to a designated color to be reproduced on a print, the program enabling a computer to function as a color value acquirer for acquiring a color value of the designated color, a corresponding position calculator for calculating a corresponding position on the color chart corresponding to the color value of the designated color, based on a color value of a candidate patch obtained by colorimetrically measuring at least one color patch extracted as the candidate patch from within the color chart, and the color value of the designated color acquired by the color value acquirer, and a display controller for displaying respectively, together with a simulating image in which a layout of the plurality of color patches on the color chart is simulated, an instruction mark image indicative of the corresponding position calculated by the corresponding position calculator.

In accordance with the color selection assisting method, the image processing method, the color selection assisting apparatus, the image processing apparatus, and the recording medium according to the present invention, a corresponding position on the color chart corresponding to the color value of the designated color is calculated based on the color value of the designated color and the color value of the candidate patch, and together with a simulating image that simulates a layout of a plurality of color patches on the color chart, an instruction mark image is displayed, which is indicative of the calculated corresponding position. Thus, by colorimetrically measuring the color chart, the operator can easily grasp the presence of a color patch that corresponds most closely to the designated color, from the relative positional relationship between the simulating image and the instruction mark image. Owing thereto, time is not wasted on needless processing steps, and a color that is closest to the designated color can be selected efficiently.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10A is a schematic front elevational view, partially omitted, of the color selection screen image shown in FIG. 9 and the like;

FIG. 10B is an outline explanatory view showing the content displayed in a display field of FIG. 9;

DESCRIPTION OF THE PREFERRED EMBODIMENTS

A color selection assisting method according to preferred first and second embodiments of the present invention, in relation to a color selection assisting apparatus (or an image processing apparatus) and a printing system for carrying out the color selection assisting method, will be described in detail below with reference to the accompanying drawings.

First, with reference to FIGS. 1 through 11, explanations shall be given concerning a color selection assisting method according to the first embodiment of the present invention.

Figure 1:
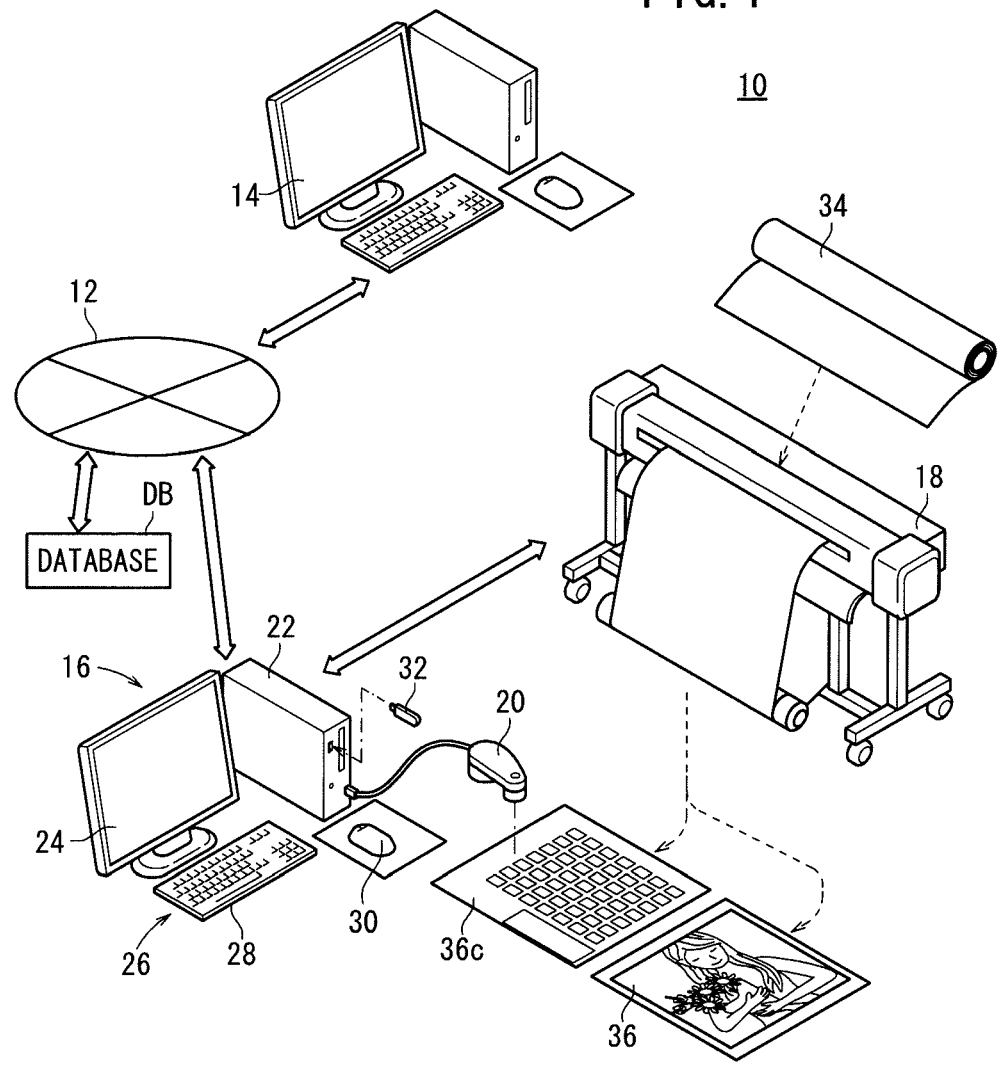
FIG. 1 is a perspective view of a printing system incorporating an image processing apparatus for effecting a color selection assisting method according to a first embodiment of the present invention.

FIG. 1 is a perspective view of a printing system 10 incorporating therein an image processing apparatus 16 for carrying out the color selection assisting method according to the first embodiment.

As shown in FIG. 1, the printing system 10 basically comprises a network 12, an editing apparatus 14, an image processing apparatus (color selection assisting apparatus) 16, a printing machine 18, and a colorimeter 20.

The network 12 is constructed according to communication standards such as Ethernet (registered trademark) or the like. The editing apparatus 14 and the image processing apparatus 16 are connected to each other and also to a database DB by a wired or wireless link over the network 12.

The editing apparatus 14 is capable of editing an arrangement of color images made up of characters, figures, pictures, photos, etc., on each of pages to be printed. The editing apparatus 14 generates electronic manuscripts (print data) in a page description language (hereinafter referred to as "PDL"), e.g., 8-bit image data in color channels of four colors (C, M, Y, K) or three colors (R, G, B).

PDL refers to a language, which is descriptive of image information including format information, position information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of AdobeSystems, and XPS (XML Paper Specification).

The image processing apparatus 16 functions to convert an electronic manuscript described by PDL into an electronic manuscript represented by raster data in a raster format, e.g., bitmap image data or TIFF data, perform desired image processing, e.g., a color conversion process, an image scaling process, an image arranging process, etc., on the raster data, convert the processed raster data into print control signals that match the printing machine 18, and send print control signals to the printing machine 18.

The image processing apparatus 16 comprises a main unit 22 including a CPU, a memory, etc., a display device (display unit) 24 for displaying color images, and an input device 26 serving as an input unit including a keyboard 28 and a mouse 30 for entering various data and operation commands to the main unit 22. The mouse 30, which serves as a pointing device, may be replaced with a track pad or a track ball.

A portable memory 32 for recording electronic data therein and deleting electronic data therefrom, and the colorimeter 20 are connected to the main unit 22 of the image processing apparatus 16.

The printing machine 18 comprises an inkjet printing apparatus for producing a color image based on a combination of standard inks of colors C, M, Y, K (process colors), and optional inks of light colors such as LC, LM, etc., and W (white). The printing machine 18 controls the propulsion of inks onto a print medium 34 (rolled non-printed medium 34 in FIG. 1), based on print control signals received from an external apparatus, e.g., the image processing apparatus 16, so as to print a color image on the print medium 34, thereby producing a print 36, which may include a color chart 36c.

The print medium 34 may comprise a paper medium such as synthetic paper, thick paper, aluminum-evaporated paper, or the like, a resin medium comprising vinyl chloride, PET, or the like, or tarpaulin, or the like.

The colorimeter 20 measures color values of an object to be measured, depending on a prescribed colorimetric processing command. Color values refer not only to device-independent data, such as tristimulus values X, Y, Z, the coordinates $L^*$, $a^*$, $b^*$ of a uniform color space, etc., but also to a distribution of optical physical quantities with respect to wavelengths (hereinafter referred to as "spectral data"). Spectral data may represent a spectral radiance distribution, a spectral sensitivity distribution, spectral reflectivity, or spectral transmittance, for example.

The database DB comprises a database server for managing data such as job tickets of electronic manuscripts, e.g., JDF (Job Definition Format) files, color sample data, target profiles, or profiles suitable for respective print mediums 34.

Figures 2A, 2B:
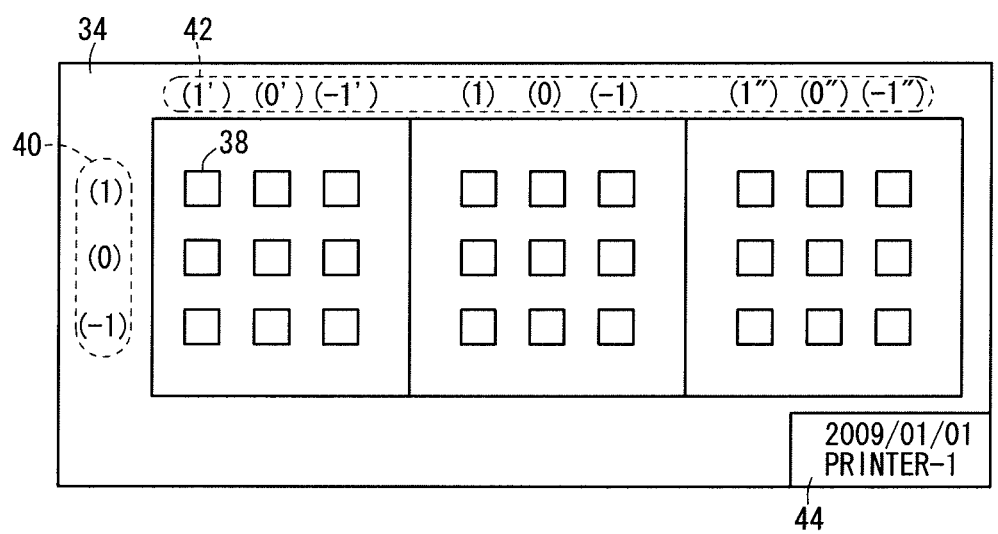
FIG. 2A is a schematic front elevational view of a color chart shown in FIG. 1.
FIG. 2B is an explanatory diagram showing a design example of respective color values of the color chart shown in FIG. 2A.

FIG. 2A is a schematic front elevational view of the color chart 36c.

As shown in FIG. 2A, the color chart 36c comprises twenty-seven color patches 38 of different colors, which are substantially identical in shape and arranged in rows and columns, a sequence of row numbers 40 (identification information) and a sequence of column numbers 42 (identification information) for identifying positions of the color patches 38 along directions of the rows and columns, and print information 44 representing various items of information for identifying printing conditions for printing the color chart 36c, all of which are printed on the print medium 34.

The color patches 38 are arranged in a two-dimensional pattern on the color chart 36c, i.e., in three matrices disposed in respective left, central, and right areas of the print medium 34, each of the matrices including 9 color patches arranged in three horizontal rows and three vertical columns and spaced by given intervals. Colors of the respective color patches 38 are set to given values in a range of signal levels of C, M, Y, K values (a percentage range from 0% to 100% or an 8-bit gradation range from 0 to 255).

The row numbers 40 are represented by (1), (0), (−1), respectively, arranged successively from above and positioned in alignment with and to the left of the respective rows of color patches 38. The column numbers 42 are represented by (1'), . . . , (−1"), respectively, arranged successively from the left and positioned in alignment with and above the respective columns of color patches 38.

The print information 44 represents a type of printing machine 18, a serial number or registration name thereof, a print mode, a type of print medium 34, a print date, etc.

FIG. 2B is a table showing a design example of color values of respective color patches 38 of the color chart 36c shown in FIG. 2A.

For arranging color patches 38 in a two-dimensional pattern, colors of the color patches 38 are changed gradually depending on positions of the color patches 38. For example, using three variables ($L^*$, $a^*$, $b^*$) of a uniform color space CIELAB, color values of each of the color patches 38 are determined according to the following equations (1) through (3):

$$L^*_i = L^*_0 + \Delta L^* \times i \text{ (where } i \text{ is an integer)} \quad (1)$$

$$a^*_j = a^*_0 + \alpha a^* \times j \text{ (where } j \text{ is an integer)} \quad (2)$$

$$b^*_k = b^*_0 + \Delta b^* \times k \text{ (where } k \text{ is an integer)} \quad (3)$$

Numbers added to the left and top of the table shown in FIG. 2B correspond respectively to the row numbers 40 and the column numbers 42. The table includes a matrix of cells, each showing three numerical values in upper, middle, and lower levels. The three numerical values are represented by values of "i", "j", "k" included in the respective equations (1), (2), (3) shown above.

The color regions formed by the respective equations (1), (2), (3) will hereinafter be referred to as color presentation ranges, which are based on the color patches 38 (also referred to as "presentation ranges"). For example, presentation ranges shown in FIGS. 2A and 2B, corresponding to regions of a rectangular parallelepiped formed by eight vertices, are represented by ($L^*_0 + \Delta L^*$, $a^*_0 + \Delta a^*$, $b^*_0 + \Delta b^*$), ($L^*_0 + \Delta L^*$, $a^*_0 + \Delta a^*$, $b^*_0 - \Delta b^*$), ($L^*_0 + \Delta L^*$, $a^*_0 - \Delta a^*$, $b^*_0 + \Delta b^*$), ($L^*_0 + \Delta L^*$, $a^*_0 - \Delta a^*$, $b^*_0 - \Delta b^*$), ($L^*_0 - \Delta L^*$, $a^*_0 + \Delta a^*$, $b^*_0 + \Delta b^*$), ($L^*_0 - \Delta L^*$, $a^*_0 + \Delta a^*$, $b^*_0 - \Delta b^*$), ($L^*_0 - \Delta L^*$, $a^*_0 - \Delta a^*$, $b^*_0 + \Delta b^*$), and ($L^*_0 - \Delta L^*$, $L^*_0"\Delta a^*$, $b^*_0"\Delta b^*$).

A typical color (e.g., a central value $L^*_0$, $a^*_0$, $b^*_0$) of the color patches 38 will be referred to as a "standard color". The color difference ($\Delta L^*$, $\Delta a^*$, $\Delta b^*$) between adjacent color patches 38 will be referred to as a "color interval". The number of color patches 38 per matrix side (three in FIG. 2A) will be referred to as a "patch count". The associative or corresponding relationship between positions of the color patches 38 and the color values shown in FIG. 2B will be referred to as a "color association", and for example, such a position of the color patch will be referred to as a "corresponding" position. The standard color, the color interval, the patch count, and the color association of the color chart 36c will collectively be referred to as "color chart conditions".

Figure 3:
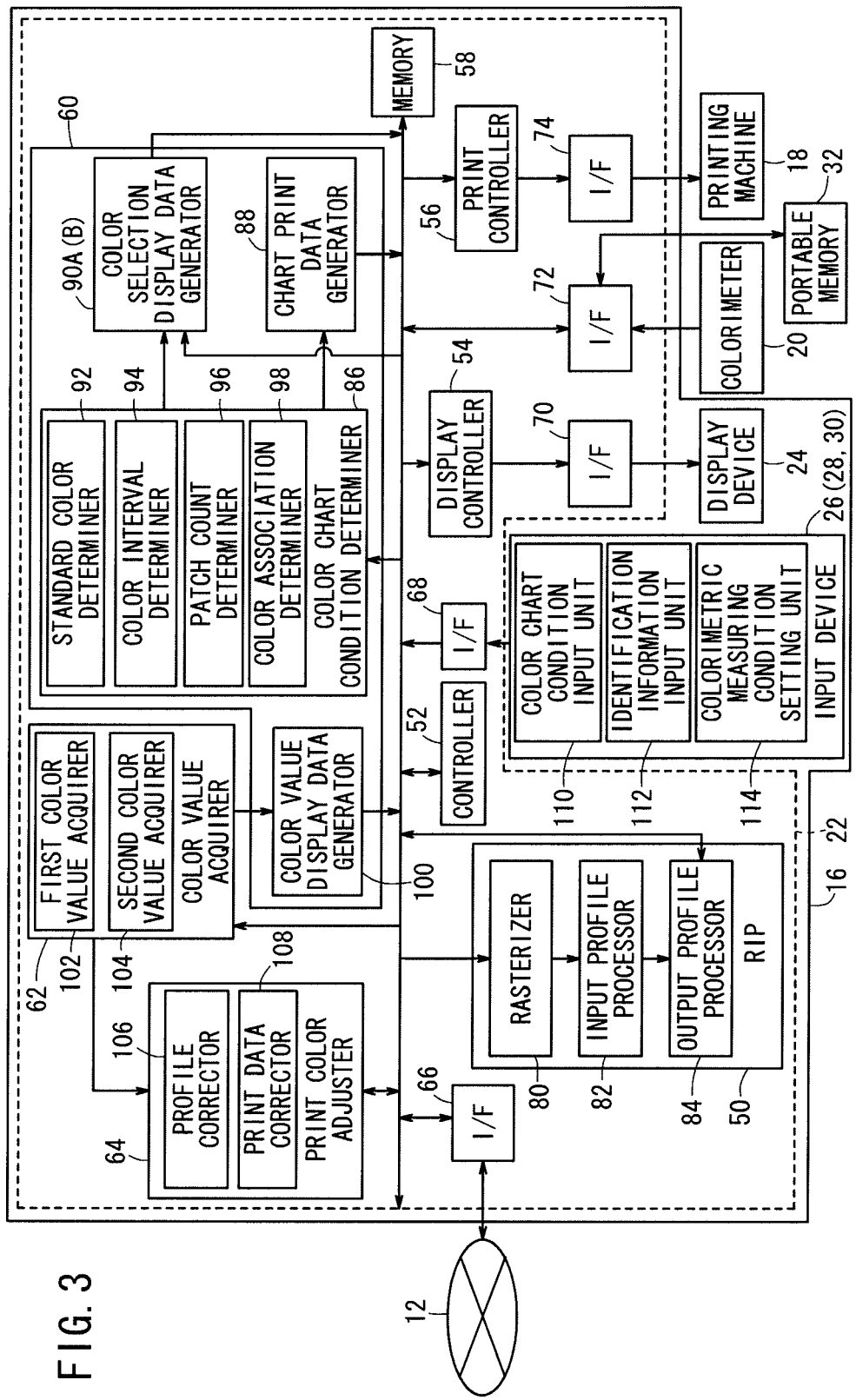
FIG. 3 is a functional block diagram of the image processing apparatus shown in FIG. 1.

FIG. 3 is a functional block diagram of the image processing apparatus 16 shown in FIG. 1.

As shown in FIG. 3, the main unit 22 of the image processing apparatus 16 includes a RIP (Raster Image Processor) 50, a controller 52, a display controller 54, a print controller 56, a memory (recording medium) 58, a color selection assistance processor 60, a color value acquirer 62, a print color adjuster 64, and five I/Fs 66, 68, 70, 72, 74.

The RIP 50 includes a rasterizer 80 for converting an electronic manuscript described by PDL into an electronic manuscript represented in a raster format, an input profile processor 82 for converting device-dependent data into device-independent data using an input profile, and an output profile processor 84 for converting device-independent data into device-dependent data using an output profile.

The controller 52, which may comprise a processor such as a CPU or the like, controls various components of the main unit 22, e.g., the RIP 50, the display controller 54, the color selection assistance processor 60, etc.

The display controller 54 is a control circuit, which is controlled by the controller 52 to energize the display device 24. More specifically, the display controller 54 outputs display control signals via the I/F 70 to the display device 24 in order to energize the display device 24 for displaying images.

The print controller 56 is a control circuit, which is controlled by the controller 52 to energize the printing machine 18. More specifically, the print controller 56 outputs print control signals via the I/F 74 to the printing machine 18 in order to energize the printing machine 18 for producing the print 36.

The memory 58 stores therein programs and data (e.g., data required for a processing sequence performed by the color selection assistance processor 60), which are required for the controller 52 to control the various components. The memory 58 may comprise a recording medium such as a nonvolatile memory, a hard disk, or the like.

The color selection assistance processor 60 includes a color chart condition determiner 86 for determining color chart conditions under which the color chart 36c is printed, a chart print data generator 88 for generating print data for printing the color chart 36c, and a color selection display data generator 90A for generating display data for displaying a simulative image, which simulates the color chart 36c.

The color chart condition determiner 86 includes a standard color determiner 92 for determining a standard color of the printed color chart 36c, a color interval determiner 94 for determining a color interval of the color patches 38, a patch count determiner 96 for determining a patch count of the color chart 36c, and a color association determiner 98 for determining a color association of the color chart 36c.

The chart print data generator 88 generates print data for printing the color chart 36c using the printing machine 18. The color selection display data generator 90A generates display data for displaying a simulative image, which simulates a layout of respective color patches 38 on the color chart 36c, and an instruction mark image (hereinafter referred to as a "guide image") indicative of a corresponding position on the color chart 36c corresponding to the color value of the designated color.

The print data generated by the chart print data generator 88, and the display data generated by the color selection display data generator 90A are not limited to raster data such as TIFF data or bitmap data, but may be print data in PDL format, including PDF and PostScript (registered trademark).

The color selection assistance processor 60 also includes a color value display data generator 100 (data converter) for generating various data for displaying respective color values acquired by the color value acquirer 62. The color value acquirer 62 includes a first color value acquirer 102 (selected color value acquirer) for acquiring color values of color patches 38, one of which ultimately is selected from the color chart 36c, as first color values (also referred to as "selected color values"), and a second color value acquirer 104 for acquiring color values of a designated color as second color values. Color value data, which are generated by the color value display data generator 100, include device-independent data and/or device-dependent data (first color values, second color values), etc., depending on the color patches 38, colors of which are reproduced by the printing machine 18.

The print color adjuster 64 includes a profile corrector 106 for correcting a color conversion table defined by the profile of the printing machine 18 into a new profile, and a print data corrector 108 for correcting portions of an electronic manuscript into suitable color values.

The input device 26 functions as a color chart condition input unit 110 for entering color chart conditions via a color selection screen image 250 (see FIG. 7, etc.) to be described later. The input device 26 also functions as an identification information input unit 112 for entering identification information (in FIG. 2, row numbers 40 and column numbers 42) of the color patches 38 via the color selection screen image 250. The input device 26 further functions as a colorimetric measuring condition setting unit 114 for setting respective variables related to colorimetric measuring conditions of the color chart 36c, via the color selection screen image 250.

Identification information of the color patches 38 may comprise information for uniquely identifying each of the color patches 38 on the color chart 36c, and may be any of various types. Identification information of the color patches 38 includes layout information (identification codes, positional relationships, etc.), or color information (color values obtained by colorimetry, etc.) of the color patches 38.

The I/F 66 makes it possible to connect the main unit 22 to the network 12. The I/F 68 makes it possible to connect the main unit 22 to the input device 26. The I/F 72 makes it possible to connect the main unit 22 to the colorimeter 20 (or the portable memory 32).

The image processing apparatus 16 is constructed in the foregoing manner. Various image processing functions referred to above can be realized by application software (programs) stored in the memory 58, such programs operating under the control of basic software (an operating system).

Programs may be recorded in a computer-readable recording medium (e.g., the portable memory 32 shown in FIG. 1), and may be read into a computer system and executed thereby. The term "computer system" includes an operating system (OS) and hardware including peripheral devices. The computer-readable recording medium comprises a portable medium made up of a storage device such as a flexible disk, a magnetooptical disk, a ROM, a CD-ROM, or the like, or a storage unit such as a hard disk or the like incorporated into the computer system. The computer-readable recording medium may also include a medium for dynamically holding programs for a short period of time, such as a communication line for transmitting programs via a network such as the Internet or the like, a communication channel such as a telephone line, or a memory for holding programs for a certain period of time, such as a volatile memory in a computer system that serves as a server or a client in a network environment.

The printing system 10 according to the first embodiment is constructed basically as described above.

Operations of the printing system 10 will be described below with reference to the flowchart shown in FIG. 4 and the functional block diagram shown in FIG. 3.

First, the operator determines printing conditions for the print 36 (step S1). Printing conditions refer to the type of printing machine 18 used to produce the print 36, the type of print medium 34, the print mode, etc.

Then, the operator obtains color information of a designated color (step S2). Such color information refers to various items of information for specifying a color, and may include not only an actual color sample, but also color values or a type, etc., of the color sample. Color values of the color sample include device-independent data or device-dependent data. The type of color sample includes a manufacturer's name, a color sample number, etc.

Next, the operator makes fine adjustments of colors of the print 36 to be printed (step S3A). Detailed operations of the image processing apparatus 16 with respect to fine adjustment of colors of the print 36 to be printed will be described later.

Then, the operator enters a prescribed command via the input device 26 to control the printing machine 18 to print the print 36 (step S4). An image processing sequence of the image processing apparatus 16 will be described below with reference to the functional block diagram shown in FIG. 3.

The image processing apparatus 16 receives an electronic manuscript (PDL format) supplied from the editing apparatus 14 via the network 12 and the I/F 66. The electronic manuscript is represented by a page description language (PDL), which describes the print 36.

The rasterizer 80 converts data of the electronic manuscript (PDL format) received from the editing apparatus 14 into device-dependent data in raster format (e.g., 8-bit C, M, Y, K values). The input profile processor 82 converts the device-dependent data acquired from the rasterizer 80 into device-independent data (e.g., L*, a*, b* values). The output profile processor 84 converts the device-independent data acquired from the input profile processor 82 into device-dependent data (e.g., C, M, Y, K values). The print controller 56 converts the device-dependent data acquired from the output profile processor 84 into print control signals (ink propulsion control data). The print controller 56 then outputs print control signals via the I/F 74 to the printing machine 18 in order to control the printing machine 18 to print a desired print 36.

Figure 4:
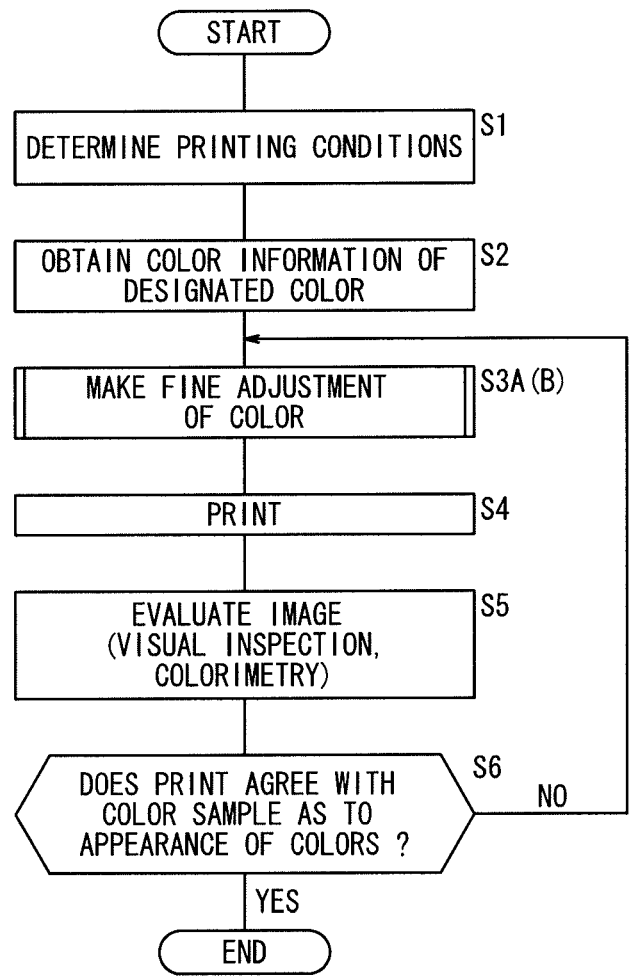
FIG. 4 is a flowchart of a sequence for producing a print of an appropriate color with the printing system shown in FIG. 1.

As shown in FIG. 4, the operator evaluates colors of the produced print 36 (step S5). The operator determines whether or not the appearance of colors in a given printed region of the print 36 and a color sample agree with each other (step S6). More specifically, the operator evaluates the appearance of colors according to a process of judging such colors through visual inspection of an overall or partial outlook of the image, or a process of determining whether or not colorimetric values of a certain area of the print 36, as measured by the colorimeter 20, fall within a desired range.

If the operator judges that the appearance of colors in the given printed region of the print 36 and the color sample are not in agreement with each other, then the operator makes fine adjustments to the colors of the print 36 to be printed (step S3A). Printing of prints 36 and evaluation of colors are repeated (steps S3A through S6) until a print 36 having desired colors can be produced.

An operation sequence of the image processing apparatus 16 (see FIGS. 1 and 3) according to the first embodiment, for making fine adjustments to colors of the print 36 to be printed (step S3A in FIG. 4), will be described in detail below with reference to the flowchart shown in FIG. 5.

In response to a prescribed action made by the operator, the image processing apparatus 16 enters color information of a designated color and acquires second color values (step S31A).

Figure 6:
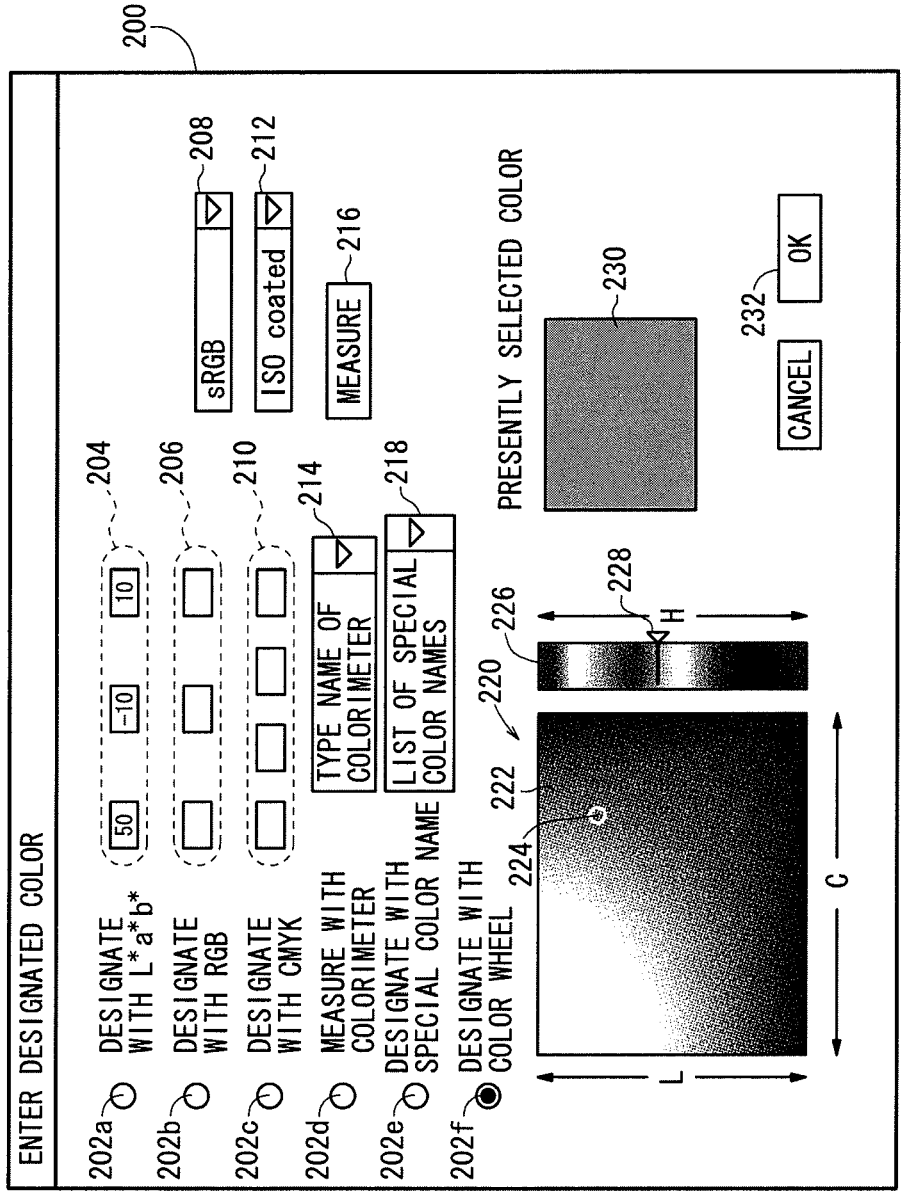
FIG. 6 is a view showing by way of example a screen image for entering color information of a designated color.

Prior to entering color information of a designated color, the display controller 54 (see FIG. 3) controls the display device 24 in order to display an input screen image 200 shown in FIG. 6.

The operator selects one of a plurality of processes (six processes in FIG. 6) for entering color information of a designated color. More specifically, the operator clicks with the mouse 30 one of radio buttons 202a through 202f on the input screen image 200, which is displayed by the display device 24 (see FIG. 1).

The radio button 202a corresponds to "DESIGNATE with L*a*b*", which represents a process of directly entering known L*, a*, b* values of a designated color. More specifically, using the keyboard 28 (see FIG. 1), the operator enters L*, a*, b* color values into three text boxes 204 successively from the left.

The radio button 202b corresponds to "DESIGNATE WITH RGB", which represents a process of directly entering known R, G, B values of a designated color. More specifically, using the keyboard 28, the operator enters R, G, B color values into three text boxes 206 successively from the left. Then, using a pull-down menu 208, the operator selects a suitable target profile (e.g., "sRGB" in FIG. 6) depending on the purpose of the print. The main unit 22 then converts the R, G, B color values (which were entered in the text boxes 206) into the L*a*b* values according to RGB-L*a*b* conversion formulas corresponding to the selected target profile.

The radio button 202c corresponds to "DESIGNATE WITH CMYK", which represents a process of directly entering the known C, M, Y, K values of a designated color. More specifically, using the keyboard 28, the operator enters C, M, Y, K color values into four text boxes 210 successively from the left. Then, using a pull-down menu 212, the operator selects a suitable target profile (e.g., "ISO coated" in FIG. 6) depending on the purpose of the print. The main unit 22 then converts the C, M, Y, K color values (which were entered in the text boxes 210) into the L*a*b* values according to CMYK-L*a*b* conversion formulas corresponding to the selected target profile.

The radio button 202d corresponds to "MEASURE WITH COLORIMETER", which represents a process of measuring a color sample such as a color chip or the like with the colorimeter 20, and entering L*, a*, b* values. More specifically, the operator sets a color sample in a state such that the color sample can be measured by the colorimeter 20. Then, using the mouse 30, the operator enters the type name of the colorimeter 20 through a pull-down menu 214, and clicks on a "MEASURE" button 216. The main unit 22 acquires color values from the colorimeter 20 via the I/F 72 (see FIG. 3).

The radio button 202e corresponds to "DESIGNATE WITH SPECIAL COLOR NAME", which represents a process of referring to special color names (selectable by a pull-down menu 218) stored and managed in the memory 58 or the database DB, and acquiring L*, a*, b* values, which correspond to a selected special color name.

The radio button 202f corresponds to "DESIGNATE WITH COLOR WHEEL", which represents a process of acquiring L*, a*, b* values using a color wheel 220. More specifically, the operator drags the mouse 30 to move a ring pointer 224 on a color pallet 222, to thereby change designated colors depending on chromaticity (C) values, as a variable on the horizontal axis of the color pallet 222, and lightness (L) values thereof, as a variable on the vertical axis of the color pallet 222. Alternatively, the operator drags the mouse 30 to vertically move a triangular pointer 228 along a bar 226, to thereby change designated colors depending on a hue (H) value thereof, as a variable on the vertical axis of the bar 226. A rectangular reference patch 230 may display a color, which is the same as the color that is currently indicated by the ring pointer 224 and the triangular pointer 228.

When the operator clicks on an "OK" button 232, the main unit 22 enters color information of the designated color and acquires L*, a*, b* values depending on the color information.

Then, in response to a prescribed action made by the operator, the image processing apparatus 16 determines a standard color, a color interval, and a patch count (step S32A). Prior to determination of the standard color, the color interval, and the patch count, the display controller 54 controls the display device 24 to display the color selection screen image 250 shown in FIG. 7.

The color selection screen image 250 includes a chart simulating image 252 (simulative image), which simulates the layout of the color patches 38 on the color chart 36c.

The color selection screen image 250 also includes a horizontally extending color bar 254 (gradation image) displayed above the chart simulating image 252. The horizontally extending color bar 254 displays a continuous gradation of colors, such that L* values thereof increase linearly (linearly over horizontal positions on the color bar 254) from a right end 254*l* to a left end 254*h* of the color bar 254. Colors displayed on the color bar 254 agree with the tendency of color changes (values L*), which depend on the layout of the color patches 38 (see FIG. 2B).

The color selection screen image 250 further includes a vertically extending color bar 256 (gradation image), which is displayed to the left of the chart simulating image 252, in a continuous gradation of colors such that b* values thereof increase linearly from a lower end 256*l* to an upper end 256*h* of the color bar 256. Colors displayed on the color bar 256 agree with the tendency of color changes (b* values), which depend on the layout of the color patches 38 (see FIG. 2B).

The color selection screen image 250 further includes a horizontally extending color bar 258 (gradation image), which is displayed beneath a left portion of the chart simulating image 252, in a continuous gradation of colors such that a* values thereof increase linearly from a left end 258*l* to a right end 258*h* of the color bar 258. Colors displayed on the color bar 258 agree with the tendency of color changes (a* values), which depend on the layout of the color patches 38 (see FIG. 2B).

The chart simulating image 252 includes twenty-seven patch images 260, and a background image 262 surrounding the patch images 260.

The color selection screen image 250 also includes a setting field 264 displayed below the chart simulating image 252, for allowing displayed details to be freely changed when given tabs are clicked on. To the right of the setting field 264, buttons 266, 268, 270, 272, 274 are displayed, indicated respectively from above by the terms, "UPDATE STANDARD COLOR", "PRINT", "FINALIZE", "RETURN", and "CANCEL".

The setting field 264 includes four pull-down menus 280, 282, 284, 286, a button 288 indicated by the term "UPDATE", and a pair of radio buttons 302 for alternatively selecting either automatic updating or manual updating of the color interval.

The operator enters a patch count ("3" in FIG. 7) for the L* axis through the pull-down menu 280 in the setting field 264, and enters a patch number ("3" in FIG. 7) for the a* axis and the b* axis through the pull-down menu 282 in the setting field 264. The operator also enters a color interval (color difference Δe="8" in FIG. 7) for the L* axis through the pull-down menu 284 in the setting field 264, and enters a color interval (color difference Δe="8" in FIG. 7) for the a* axis and the b* axis through the pull-down menu 286 in the setting field 264.

Figure 7:
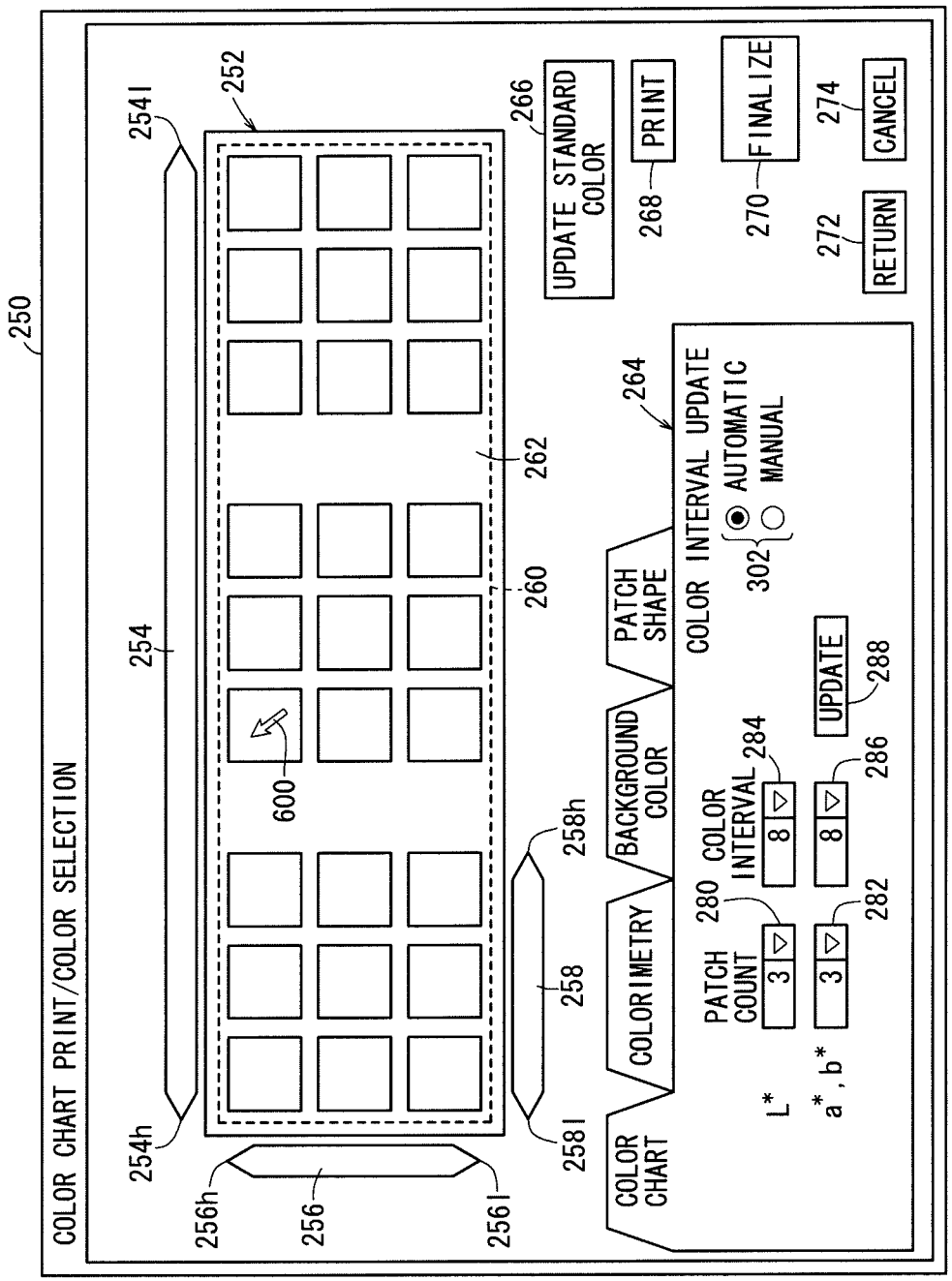
FIG. 7 is a view showing by way of example a color selection screen image.

Then, the display controller 54 updates and displays the color selection screen image 250 shown in FIG. 7 (step S33A).

The color chart condition determiner 86, as shown in FIG. 3, reads and acquires predetermined initial values of color chart conditions from the memory 58. Alternatively, in response to the operator clicking on the "UPDATE" button 288, the color chart condition determiner 86 may acquire presently set color chart conditions from the color chart condition input unit 110 via the I/F 68.

The color selection display data generator 90A acquires color chart conditions from the color chart condition determiner 86. At this time, the standard color determiner 92 determines as the standard color the input values of the patch image 260 (see FIG. 7) entered through the input screen image 200 (see FIG. 6). The color interval determiner 94 determines as the color interval the input values, which are input through the setting field 264 (using the pull-down menus 284, 286 of FIG. 7). The patch count determiner 96 determines as the patch count of the chart simulating image 252 the input values, which are input through the setting field 264 (using the pull-down menus 280, 282 of FIG. 7). The color association determiner 98 determines an associative relationship (see FIG. 2B) between the color values and positions of each of the patch images 260 in the chart simulating image 252.

Below, explanations shall be made, with reference to the detailed block diagram of FIG. 8, concerning operations of the color selection display data generator 90A upon generation of display data responsive to the chart simulating image 252.

Figure 8:
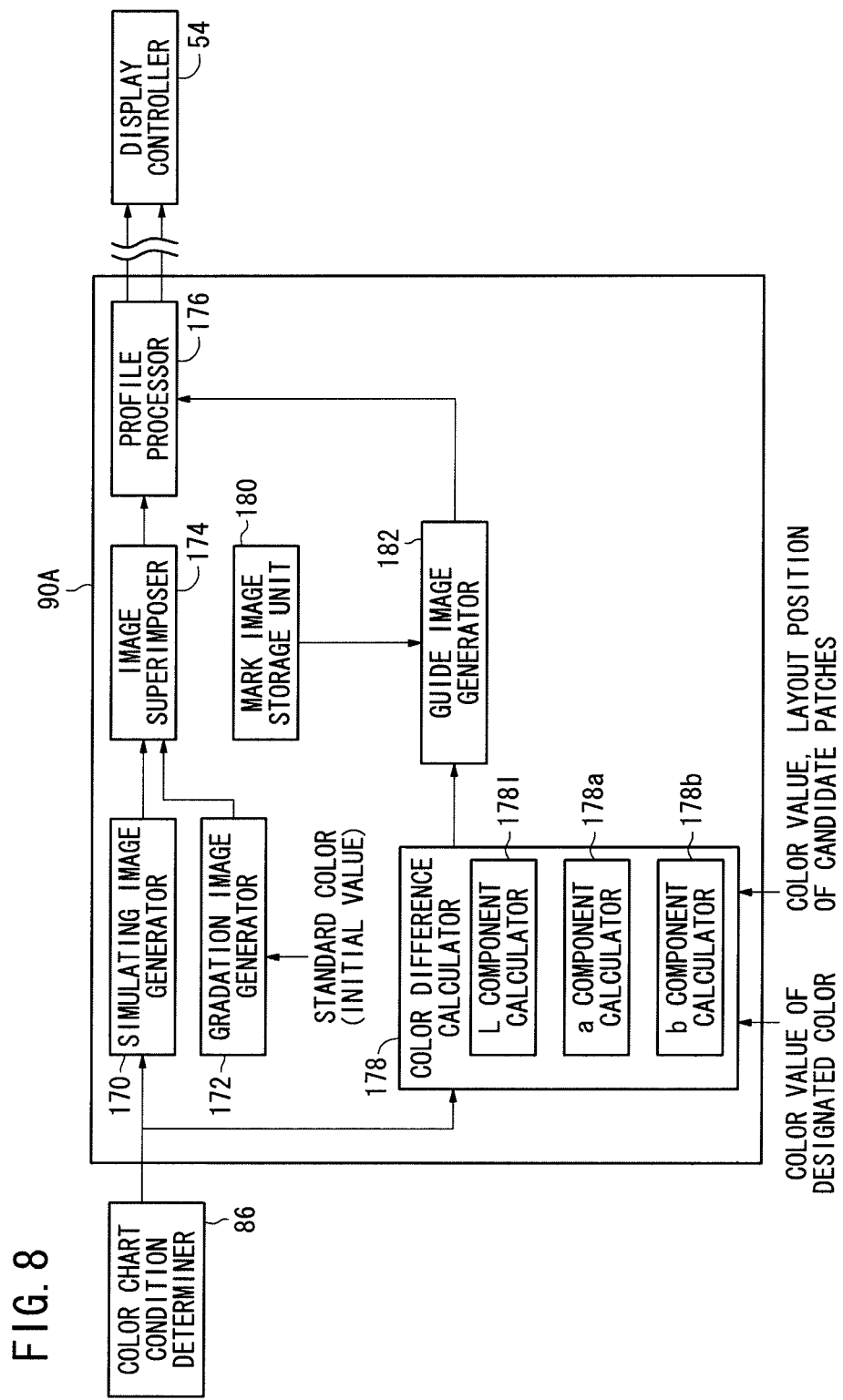
FIG. 8 is a detailed block diagram of a color selection display data generator according to the first embodiment.

As shown in FIG. 8, the color selection display data generator 90A (see FIG. 3) includes a simulating image generator 170 for generating the chart simulating image 252, a gradation image generator 172 for generating the color bars 254, 256, 258, an image superimposer 174 for superimposing the chart simulating image 252 and the color bars 254, etc., and a profile processor 176 for performing an output profile process (color converting process) on the superimposed images, which is suitable for the display device 24.

The simulating image generator 170, using the patch count acquired from the color chart condition determiner 86, determines address data corresponding to positions at which the respective patch images 260 are disposed. Thereafter, the simulating image generator 170, using the standard color, the color interval, and the color association acquired from the color chart condition determiner 86, determines color values for each of the patch images 260. The simulating image generator 170 generates the chart simulating image 252 based on the address data and color values from each of the patch images 260.

On the other hand, the gradation image generator 172 generates color bars 254 etc. that match the tendency of the color change corresponding to the layout of the color patches 38. In the example of FIG. 8, color bars 254, etc., are generated having a gradation centered about the initial value of the standard color, i.e., the second color value entered via the input screen image 200 (see FIG. 6). Further, the displayed condition of the color bars 254, etc., may be changed in various ways responsive to the presentation range.

Thereafter, the image superimposer 174 superimposes the chart simulating image 252 acquired from the simulating image generator 170 and the color bars 254 etc., acquired from the gradation image generator 172. The image superimposer 174 arranges the chart simulating image 252 within a predetermined data area, and arranges the color bars 254, 256, 258 around the three sides thereof separated by predetermined intervals.

Then, the profile processor 176 performs a profile process, which is suitable for the display device 24, on the superimposed image data acquired from the image superimposer 174, thereby producing display data. More specifically, the profile processor 176 converts the superimposed image data from device-independent data (e.g., L*, a*, b* values) into device-dependent data (e.g., R, G, B values).

Finally, the display controller 54 outputs the display data acquired from the profile processor 176 via the I/F 70 to the display device 24, and controls the display device 24 to display the color selection screen image 250 (chart simulating image 252) of FIG. 7.

In this manner, in the color selection screen image 250 shown in FIG. 7, in accordance with the presently entered color chart conditions, the displayed colors or the number of patch images 260 in the chart simulating image 252 are updated and displayed immediately (step S33A).

Figure 5:
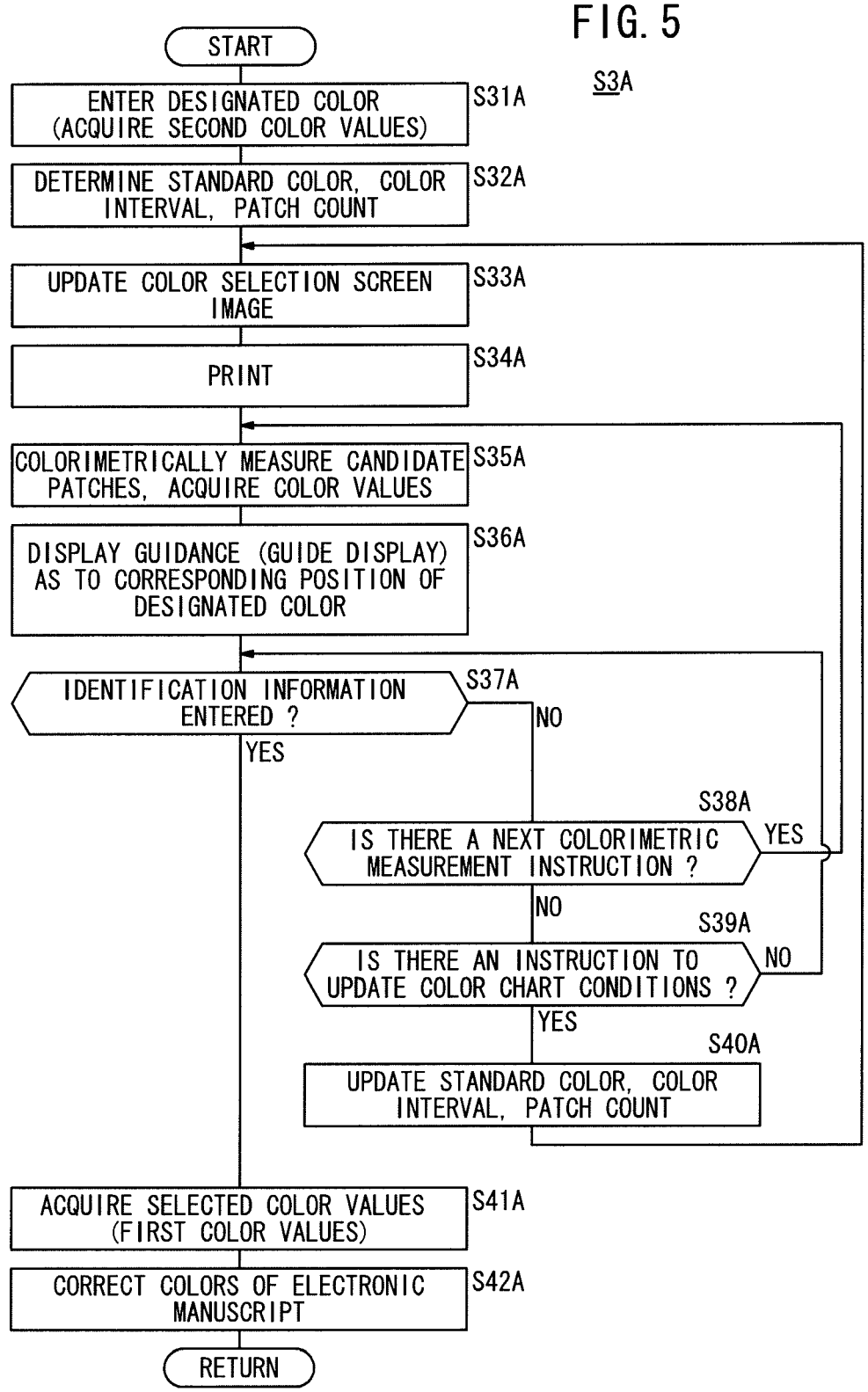
FIG. 5 is a flowchart for explaining operations of the image processing apparatus, which carries out the color selection assisting method according to the first embodiment of the present invention, during a fine color adjusting step.

Then, the operator enters a prescribed command in order to instruct the printing machine 18 to print the color chart 36c (step S34A) (see FIG. 5).

In response to the operator clicking on the "PRINT" button 268 (see FIG. 7), the color chart condition determiner 86 (see FIG. 3) acquires the presently set color chart conditions from the color chart condition input unit 110 via the I/F 68.

In addition, the chart print data generator 88, similar to the aforementioned operations of the simulating image generator 170 (see FIG. 8), generates print data for printing the color chart 36c, based on color chart conditions (standard color, color interval, patch number, and color association) acquired from the color chart condition determiner 86.

The RIP 50 appropriately processes the print data extracted from the color chart condition determiner 86, and supplies the processed print data to the print controller 56. If the print data are PDL-format data, then the RIP 50 instructs the rasterizer 80 and the output profile processor 84 to process the print data. Alternatively, if the print data are raster-format data, then the RIP 50 instructs the output profile processor 84 to process the print data.

Additionally, the print controller 56 outputs the processed print data via the I/F 74 to the printing machine 18, and controls the printing machine 18 to print the color chart 36c.

The operator compares and evaluates the color patches 38 on the color chart 36c printed in step S34A with the color sample (designated color), which is to be reproduced by the printing machine 18. Then, from within the color chart 36c, the operator selects a color patch 38 closest in color to the color sample. According to the first embodiment, the operator colorimetrically measures the color patches 38 using the colorimeter 20, and selects a color patch 38 having a color that the operator thinks is closest to the designated color, based on color values obtained by the colorimeter 20. Upon selection of the color patch 38, as a result, no problem occurs as to whether or not a color can be selected for which the color difference thereof from the color sample (designated color) is minimized.

Next, in the image processing apparatus 16, in accordance with colorimetric measurements using the colorimeter 20, the color value of a desired color patch 38 is entered (step S35A).

The operator, using the colorimeter 20, directly measures each of the color patches 38 colorimetrically. For example, one color patch 38 {row number 40 (1), column number 42 (1)} is extracted as a candidate patch. The candidate patch is defined as a color patch 38, which is extracted for comparison and evaluation with a color sample (designated color) from among the color patches 38 (for example, the twenty-seven color patches in FIG. 2A) on the color chart 36c. The number of extracted candidate patches is not limited to one, but several candidate patches may be extracted simultaneously.

Upon completion of colorimetric measurement operations on the color patches 38, the image processing apparatus 16 inputs the color value of the candidate patch via the colorimeter 20 and the I/F 72.

In step S31A, in the case that the color value of the designated color is input using the colorimeter 20, then the candidate patch may also be measured colorimetrically using the same colorimeter 20. Thus, variances in measurement precision due to differences in the type and individual characteristics of separate colorimeters 20 can be avoided.

Next, the display controller 54 displays on the display device a guide image, which indicates the corresponding position of the designated color (step S36A). More specifically, the display controller 54, responsive to input of a color value from the colorimeter 20, updates and displays the color selection screen image 250 as shown in FIG. 7, whereby an auxiliary display for assisting color selection is displayed. Below, explanations shall be given with reference to the detailed block diagram of FIG. 8 concerning operations of the image processing apparatus 16 for the purpose of realizing the auxiliary display.

The color selection display data generator 90A is further equipped with a color difference calculator (corresponding position calculator) 178 for calculating each of color components of the designated color and the candidate patches, a mark image storage unit 180 for storing instruction mark images 620 (to be described in detail later with reference to FIG. 9), and a guide image generator 182 for creating the guide image. The color difference calculator 178 is constituted by an L-component calculator 178l for calculating a difference value in L* components, an a-component calculator 178a for calculating a difference value in a* components, and a b-component calculator 178b for calculating a difference value in b* components.

Next, operations of the color selection display data generator 90A shall be described in detail.

First, the color difference calculator 178 acquires color values of the candidate patch (one color patch 38) via the colorimeter 20 and the I/F 72. The color difference calculator 178 calculates the color difference between the color values of the designated color acquired from the memory 58 and the color values of the candidate patch acquired from the colorimeter 20. More specifically, the L-component calculator 178l calculates a difference value between L* components, the a-component calculator 178a calculates a difference value between a* components, and the b-component calculator 178b calculates a difference value between b* components of the color values.

The guide image generator 182 generates guide image data based on the color values of candidate patch and the difference values of the respective color components both of which are acquired from the color difference calculator 178, and based on instruction mark images 620 acquired from the mark image storage unit 180.

The guide image generator 182 determines content to be displayed (i.e., a digit sequence 618 of FIG. 9) from the color values of the candidate patch. Further, the guide image generator 182 determines content to be displayed (i.e., a digit sequence 622 of FIG. 9) by extracting absolute values (unsigned values) from difference values of the respective color components. In addition, the guide image generator 182 determines content to be displayed (orientation/color of the instruction mark images 620 of FIG. 9) by extraction of signs from the difference values of the respective color components. Further, the guide image generator 182 determines content to be displayed (i.e., a digit sequence 616 of FIG. 9) by calculating a color difference Δe from the difference values of each of the present color components.

Thereafter, the profile processor 176 carries out a suitable profile process on the display device 24 to be used for display, with respect to the guide image data acquired from the guide image generator 182, whereby display data is obtained. Lastly, the display controller 54 outputs via the I/F 70 the display data obtained from the profile processor 176, and displays the color selection screen image 250 of FIG. 9 on the display device 24.

Figure 9:
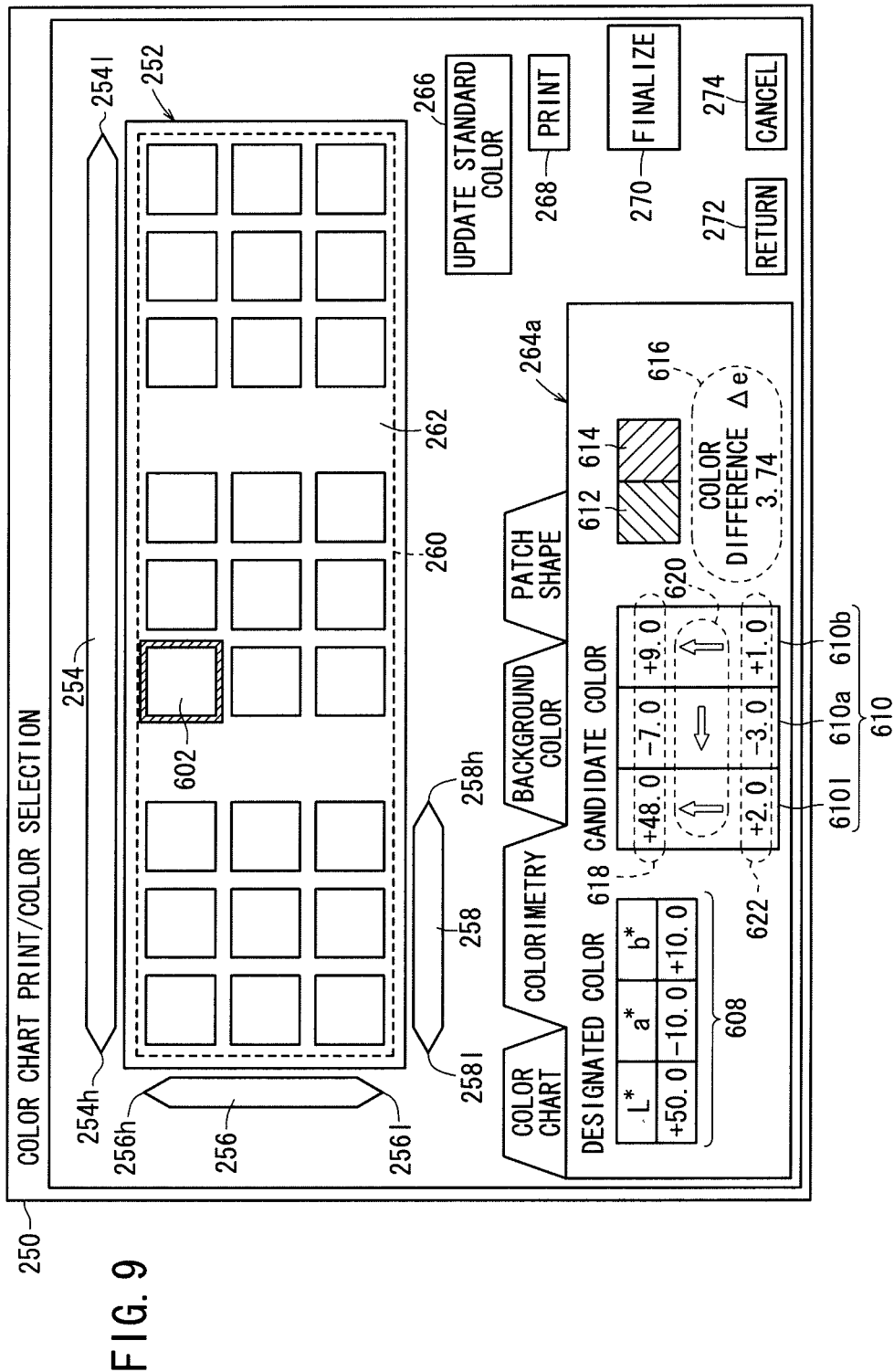
FIG. 9 is a view showing a first change of the color selection screen image shown in FIG. 7.

As shown in FIG. 9, in response to clicking on a given tab, a setting field 264a is displayed anew by the display device 24, the displayed content of which differs from the setting field 264 of FIG. 7.

In the setting field 264a, there are displayed a color value display field 608 that displays color values of the designated color, a guide display field 610 that indicates a corresponding position of the designated color using the color value of the candidate patch as a reference, a color patch 612 displaying the same color as the designated color, a color patch 614 displaying the same color as the candidate patch, and the digit sequence 616 displaying the color difference (Δe) between the color value of the candidate patch and the designated color.

In the color value display field 608, there are displayed respectively color values of the designated color (from the left, L*, a*, and b* values), which were entered in step S31A.

The guide display field 610, in order from the left side thereof, includes a display field 610l for displaying color difference information of L* components, a display field 610a for displaying color difference information of a* components, and a display field 610b for displaying color difference information of b* components. Further, in the guide display field 610, there are displayed the digit sequence 618 showing color values of the candidate patch, instruction mark images 620 that indicate a corresponding position of the designated color using the candidate patch as a reference, and the digit sequence 622 showing difference color values between the candidate patch and the designated color.

The operator, while referring to each type of information displayed in the setting field 264a, performs comparison and evaluation between the designated color and the candidate patch.

The indication directions of the instruction mark image 620 and the colors thereof may be associated with one another in advance. For example, in the event that the L* value is indicated leftwardly, the instruction mark image 620 for the L* value is colored with the color shown by the left end 254h of the color bar 254. On the other hand, in the event that the L* value is indicated rightwardly, the instruction mark image 620 therefor is colored with the color shown by the right end 254l of the color bar 254. The a* and b* values are handled in a similar manner.

Next, returning to FIG. 5, the image processing apparatus discerns whether or not identifying information for the color patch 38 has been entered or not (step S37A). In the case that a predetermined operation therefor has been accepted, the image processing apparatus 16 discerns that identifying information for the color patch 38 has been entered.

For example, in FIG. 7, under a condition in which a pointer 600 is disposed within the chart simulating image 252, responsive to a clicking operation of the mouse 30 by the operator, one individual color patch 38 {row number 40 (1), column number 42 (1)} is selected at the present time. More specifically, as shown in FIG. 9, the condition is changed such that a frame is placed around the outer periphery of a patch image 602 at the designated position of the pointer 600 (compare with FIG. 7).

Additionally, the image processing apparatus 16 discerns whether or not a clicking operation of the "FINALIZE" button 270 has been made under a condition in which the patch image 602 has been selected.

Concerning selection of the color patches 38, only one color patch 38 may be selected in the event that the degree of proximity thereof with the designated color is extremely high. Further, using a GUI control such as a color wheel or the like, an intermediate color between adjacent color patches may be entered. Further, in the event that no relevant colors exist among the twenty-seven color patches 38, a selection may be made outside of the presentation range. Furthermore, a color sample number or color value that corresponds to the color of the selected color patch 38 may be entered directly via a text box or the like.

In the case that identifying information of the color patch 38 has not been entered, the image processing apparatus 16 determines whether or not there is a colorimetric measuring instruction for the next color patch 38 (step S38A). If a predetermined operation is accepted, the image processing apparatus 16 judges that there is a colorimetric measuring instruction. For example, under a condition in which a patch image 260 in the chart simulating image 252 (see FIG. 7) (a patch image 260 that is different or the same as the patch image 602) has been selected, the image processing apparatus 16 judges whether or not a colorimetric measurement operation has been made for the color patch 38 by the colorimeter 20 (see FIG. 1).

In the case that a colorimetric measurement instruction for the next color patch 38 has been accepted, the image processing apparatus 16 returns to step S35A, and another candidate patch is measured colorimetrically, i.e., acquisition of color values for the color patch 38 is repeated (steps S35A through S38A).

On the other hand, in the event there is not a next colorimetric measurement instruction, it is further determined whether or not there is an updating instruction for the color chart conditions (step S39A). If a predetermined operation therefor is accepted, the image processing apparatus 16 determines that an updating instruction for the color chart conditions is present. For example, under a condition in which any patch image 260 within the chart simulating image 252 (see FIG. 7) has been selected, a determination is made as to whether or not a clicking operation of the "UPDATE STANDARD COLOR" button 266 has been made.

If an updating instruction for the color chart conditions is not present, step S37A is returned to, and steps S37A through S39A are repeated in succession. More specifically, the image processing apparatus 16 waits until identifying information for the color patch 38 has been entered or until a next colorimetric measurement instruction is made.

Next, returning to FIG. 5, if an updating instruction for the color chart conditions exists, i.e., after the image processing apparatus 16 accepts clicking on the "UPDATE STANDARD COLOR" button 266 of FIG. 7, then the color chart condition determiner 86 acquires color chart conditions from the color chart condition input unit 110 via the I/F 68, and updates respective values of the standard color, the color interval, and the patch count (step S40A). The color chart condition determiner 86 may update the values of the standard color, the color interval, and the patch count according to any of various determining algorithms, one example of which is described below.

The standard color determiner 92 shown in FIG. 3 determines color values depending on the patch image 260 (e.g., patch image 602) entered (selected) in step S39A as representing a new standard color.

The color interval determiner 94 determines a color interval of the color patches 38 automatically or manually, depending on the selection result made by the pair of radio buttons 302 shown in FIG. 7.

If the operator selects "MANUAL" with one of the radio buttons 302, then the color chart condition determiner 86 determines a color interval, which is the same as the previously determined color interval. Then, upon execution of step S33A or step S34A, the operator can reset the color interval using the pull-down menus 284, 286. More specifically, after the entered values have been changed, the operator clicks on the "UPDATE" button 288, and the color interval determiner 94 determines the entered and changed values as a new color interval.

On the other hand, if the operator selects "AUTOMATIC" with the other radio button 302, then the color interval determiner 94 determines a new color interval according to predetermined rules. For example, if it is judged that a color closest to the designated color exists within the presentation range on the previous color chart 36c, then the color interval determiner 94 determines a value, which is one-half of the previously determined color interval, as a new color interval. In contrast thereto, if it is judged that a color closest to the designated color does not exist within the presentation range, then the color interval determiner 94 determines a value, which is the same as that of the previously determined color interval, as the new color interval.

Next, the display controller 54 updates and displays the color selection screen image 250 shown in FIG. 9 (step S33A). Subsequently, steps S33A through S40A are repeated until a color has been finalized.

Figures 10A, 10B:
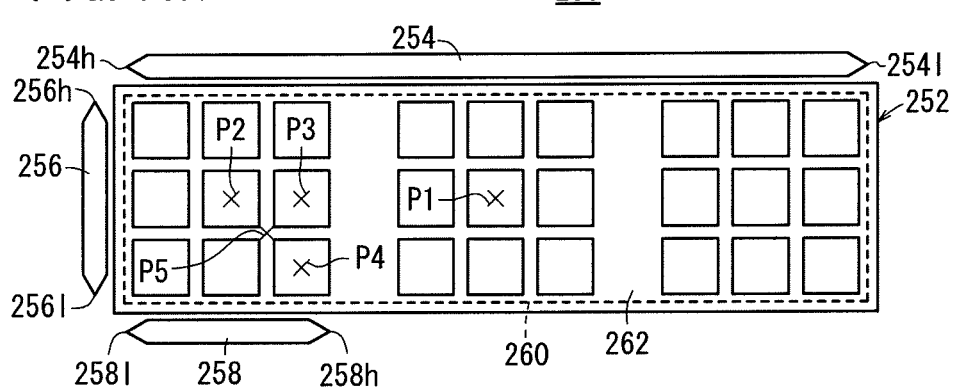
Figure 11:
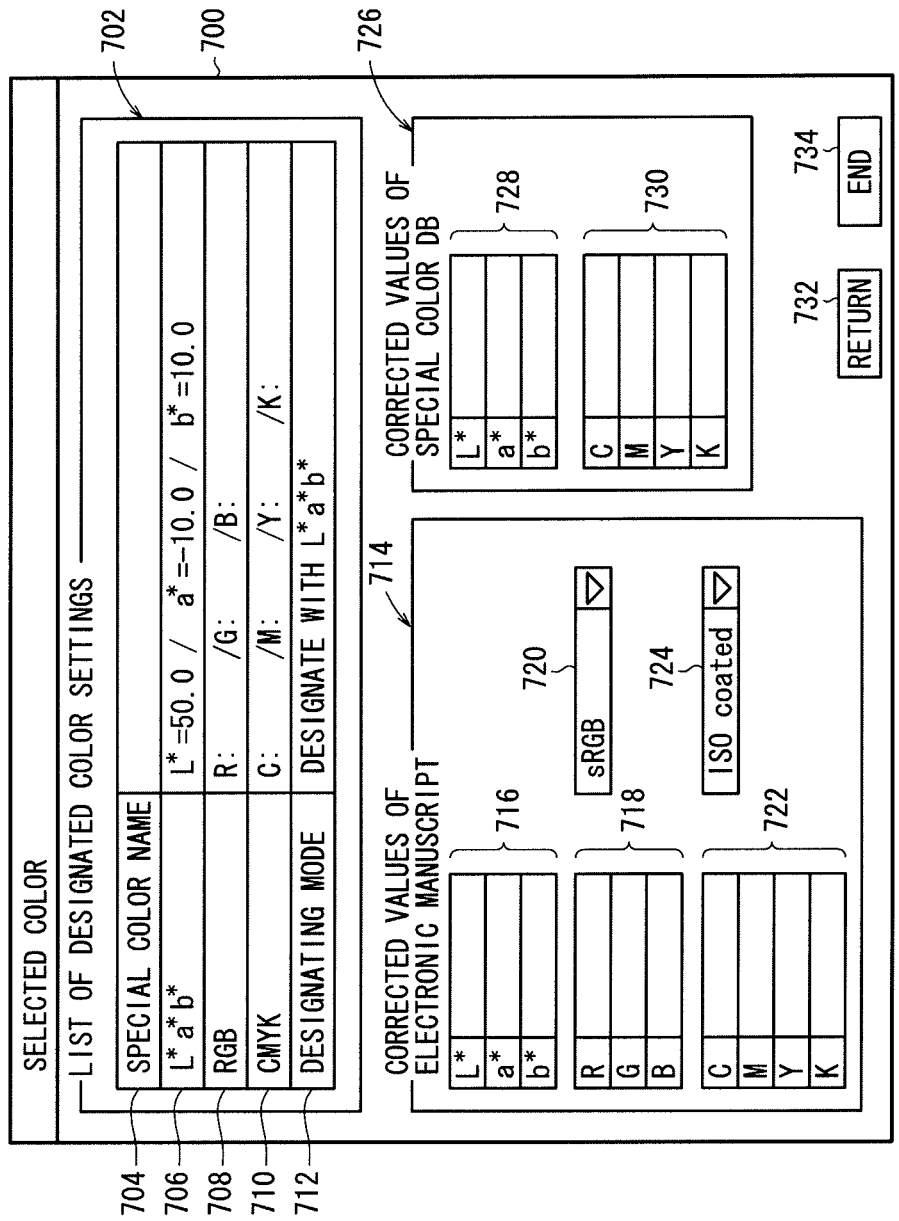
FIG. 11 is a view showing by way of example a screen image that displays a color selection result.

An example of color selection operations using the guide display (display of setting field 264a) according to the first embodiment shall be described with reference to FIGS. 10A and 10B. FIG. 10A is a schematic front elevational view, partially omitted, of the color selection screen image shown in FIG. 9 etc., whereas FIG. 10B is an outline explanatory view showing the content displayed in the display field 610 of FIG. 9.

First, the operator colorimetrically measures the color patch 38 corresponding to position P1 {row number 40 (0), column number 42 (0)}. Immediately following completion of measurement thereof, the content (i.e., the digit sequences 618, 622 and the instruction mark image 620 of FIG. 9) of the P1th row in FIG. 10B is displayed in the display field 610 of the color selection screen image 250. Additionally, the operator visually confirms the content of the display field 610l (the leftward oriented arrow), and selects the position to the left of position P1, i.e., position P2.

Next, the operator colorimetrically measures the color patch 38 corresponding to position P2 {row number 40 (0), column number 42 (0')}. Immediately following completion of measurement thereof, the content (i.e., the digit sequences 618, 622 and the instruction mark image 620 of FIG. 9) of the P2th row in FIG. 10B is displayed in the display field 610 of the color selection screen image 250. Additionally, the operator visually confirms the content of the display field 610a (the rightward oriented arrow), and selects the position to the right of position P2, i.e., position P3.

Next, the operator colorimetrically measures the color patch 38 corresponding to position P3 {row number 40 (0), column number 42 (−1')}. Immediately following completion of measurement thereof, the content (i.e., the digit sequences 618, 622 and the instruction mark image 620 of FIG. 9) of the P3th row in FIG. 10B is displayed in the display field 610 of the color selection screen image 250. Additionally, the operator visually confirms the content of the display field 610b (the downward oriented arrow), and selects the position below position P3, i.e., position P4.

Next, the operator colorimetrically measures the color patch 38 corresponding to position P4 {row number 40 (−1), column number 42 (−1')}. Immediately following completion of measurement thereof, the content (i.e., the digit sequences 618, 622 and the instruction mark image 620 of FIG. 9) of the P4th row in FIG. 10B is displayed in the display field 610 of the color selection screen image 250. Additionally, the operator visually confirms the content of the display field 610b, and selects the position to the upper-left of position P4, i.e., position P5.

With each colorimetric measurement of the color chart 38, the operator may refer to changes in the values of the digit sequence 616 (representative of the color difference Δe from the designated color). Owing thereto, colors can be selected more efficiently.

Hereinabove, an example has been presented concerning a method for estimating the positions P1 through P5 based on the operator making an independent judgment while referring to the content displayed in the display field 610. Apart from this method, the image processing apparatus 16 may provide a navigation display for navigating through the color patches 38 to be colorimetrically measured, based on the results of preset determining process calculations.

For example, the image processing apparatus 16, prior to colorimetrically measuring candidate patches after printing the color chart 36c, displays in a blinking fashion the patch image 260 corresponding to the position P1. In addition, after colorimetrically measuring the color patch 38 {row number 40 (0), column number 42 (0)}, the image processing apparatus 16 displays in a blinking fashion the patch image 260 corresponding to the position P2. In this manner, the operator can select an appropriate color patch 38 by tracking changes in the displayed content of the patch images 260 and sequentially carrying out colorimetric measurements on the color patches 38.

In the foregoing manner, while referring to the guide display as needed, the standard color determining step (irrespective of whether the determination means is manual or automatic), the printing step of the color chart 36c, and the step of selecting a color patch 38 are carried out at least one time in succession (steps S33A through S40A). In addition, in the event that the color determination is finalized, the process sequence moves on to the next step (step S41A). Among steps S31A to S40A, the color value of the color patch 38 that is last selected (i.e., the finalized color patch 38) represents the first color value (selected color value).

Then, the first color value acquirer 102 acquires the selected color values as first color values (step S41A). When the operator clicks on the "FINALIZE" button 270 displayed in the color selection screen image 250 (see FIGS. 7 and 9), the first color value acquirer 102 acquires color chart conditions from the color chart condition input unit 110 via the I/F 68, and also acquires the row number 40 and the column number 42 from the identification information input unit 112. Then, the first color value acquirer 102 calculates and acquires color values (selected color values) depending on the finally selected color patch 38, based on the standard color, the color interval, the color association, the row number 40, and the column number 42.

At the same time, the second color value acquirer 104 acquires a color value, which has been entered as a designated color through the input screen image 200 (see FIG. 6), as a second color value. The second color value may be either device-dependent data or device-independent data.

Finally, the image processing apparatus 16 corrects colors of the electronic manuscript (step S42A).

A first correction process for replacing given color values of the electronic manuscript (print data) with appropriate color values will be described below. After step S41A, the color value display data generator 100 acquires first color values and second color values from the color value acquirer 62, and also acquires the profile of the printing machine 18 from the memory 58 or the like. The color value display data generator 100 then generates various data (device-independent data and/or device-dependent data) for displaying on the display device 24 color information suitable for reproducing colors using the printing machine 18.

Then, the display controller 54 controls the display device 24 to display a selected color screen image 700, which displays a selected color (including the various data discussed above) shown in FIG. 11.

The operator can correct colors of the electronic manuscript while referring to the color information displayed in the selected color screen image 700.

The selected color screen image 700 includes a field 702 in an upper area thereof for displaying color information (including first color values) of the designated color, which has been entered in the input screen image 200 (see FIG. 6).

For example, if a special color name is entered via the pull-down menu 218 shown in FIG. 6, then the entered special color name is displayed in a cell 704 in the field 702. L*, a*, b* values, which correspond to the special color name, are displayed in a cell 706 of the field 702. R, G, B values, which correspond to the special color name, are displayed in a cell 708 of the field 702. C, M, Y, K values, which correspond to the special color name, are displayed in a cell 710 of the field 702. The method of designating color values, i.e., "DESIGNATE WITH SPECIAL COLOR NAME", is displayed in a cell 712 of the field 702.

The selected color screen image 700 includes a field 714 in a lower left area thereof for displaying color values (corrected values of an electronic manuscript) for reproducing the designated color with the printing machine 18.

For example, the first color values (device-independent data), i.e., L*, a*, b* values, are displayed as selected color values in a set of cells 716 of the field 714.

Values produced in a case where the first color values are converted into device-dependent data using a desired profile, i.e., R, G, B values, are displayed in a set of cells 718 of the field 714. In response to selection of a profile via the pull-down menu 208 (see FIG. 6), the color value display data generator 100 converts the first color values into R, G, B values according to an L*a*b*-RGB conversion table included in the profile. The produced R, G, B values are displayed immediately in the set of cells 718 of the field 714.

Furthermore, values produced in a case where first color values are converted into device-dependent data using a desired profile, i.e., C, M, Y, K values, are displayed in a set of cells 722 of the field 714. In response to selection of a profile via the pull-down menu 212 (see FIG. 6), the color value display data generator 100 converts the first color values into C, M, Y, K values according to an L*a*b*-CMYK conversion table included in the profile. The produced C, M, Y, K values are displayed immediately in the set of cells 722 of the field 714.

The selected color screen image 700 also includes a field 726 in a lower right area thereof for displaying corrected values of a special color database. For example, first color values (device-independent data), which serve as selected color values, i.e., L*, a*, b* values, are displayed in a set of cells 728 of the selected color screen image 700. Values produced in a case where the first color values are converted into device-dependent data using the profile entered through the pull-down menu 212 (see FIG. 6), i.e., C, M, Y, K values, are displayed in a set of cells 730 of the selected color screen image 700.

The operator acquires any one of types of the color information displayed in the selected color screen image 700, and corrects color values of the electronic manuscript using the acquired color information. For example, the operator may have the print data corrector 108 (see FIG. 3), which includes a data editing function, correct the color values of the electronic manuscript.

Management information (L*, a*, b* values or C, M, Y, K values) of the special color database, which is stored in the image processing apparatus 16 or in an apparatus external to the image processing apparatus 16, e.g., the database DB, may be updated automatically or manually to produce the corrected values referred to above. Colors of the print 36 can be adjusted using the updated special color data.

According to a second correction process, a color conversion table included in a profile may be corrected. More specifically, the profile corrector 106 acquires from the color value acquirer 62 the first color values, which are selected and acquired as representing a color that is closest to the designated color, and the second color values representing the color values of the designated color. The profile corrector 106 then corrects the color conversion table, based on differences between the first color values and the second color values, thereby correcting the profile.

Fine adjustment of colors of the print 36 is now completed (step S3A).

In this manner, based on the color values of the designated color and the candidate patch, a corresponding position on the color chart 36*c* associated with the color value of the designated color is calculated, and together with the chart simulating image 252 in which the layout of multiple color patches 38 on the color chart 36*c* is simulated, an instruction mark image 620 is displayed, which is indicative of the calculated corresponding position. The operator, by colorimetrically measuring the color chart 36*c*, can easily grasp from the relative positional relationship between the chart simulating image 252 and the instruction mark image 620 the existence of a color patch 38 that is closest to the designated color.

Further, because the color values are classified into each of respective color components (i.e., L*, a*, b*), and the instruction mark images 620 are displayed respectively in the guide display field 610 (610*l*, 610*a*, 610*b*), the operator can easily grasp in which direction color patches 38 having colors closer to the designated color exist.

Furthermore, because the instruction mark image 620 is an image (e.g., an arrow image in the example of FIG. 9) that shows the direction toward the corresponding position from the position at which the candidate patch (patch image 602) is disposed, the operator can easily grasp at a glance, based on the position at which the candidate patch is disposed, the direction of the color patch 38 to be selected.

Next, a color selection assisting method according to a second embodiment shall be described with reference to FIGS. 12 through 14. Structural features of the printing system 10 (see FIG. 1), the color chart 36*c* (see FIGS. 2A and 2B), and the image processing apparatus 16 are the same as those of the first embodiment, and thus detailed explanations of such features shall be omitted. The method of operation of a color selection display data generator 90B differs from that of the first embodiment (i.e., the color selection display data generator 90A). Details thereof are described below.

Figure 12:
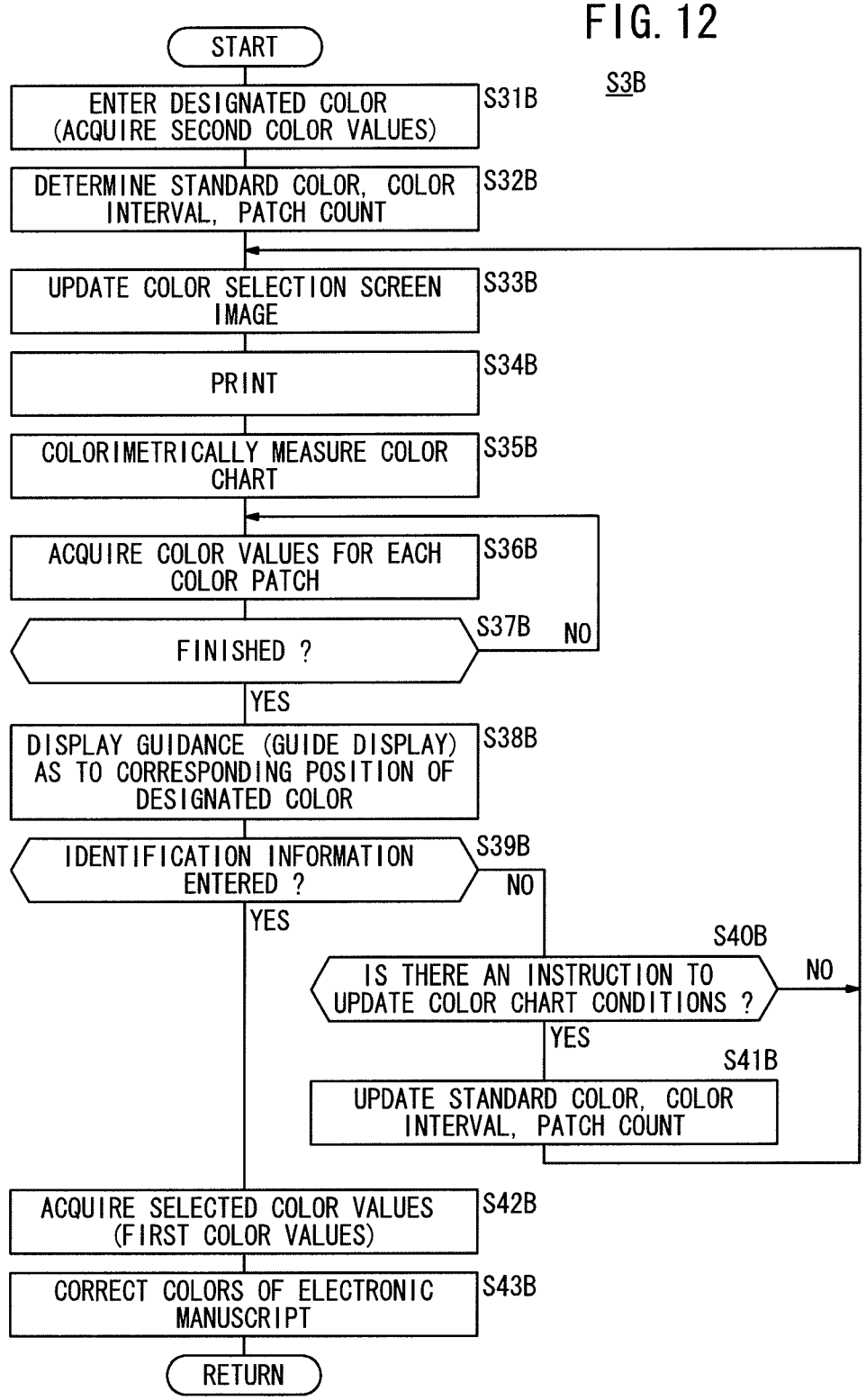
FIG. 12 is a flowchart for explaining operations of the image processing apparatus, which carries out a color selection assisting method according to the second embodiment of the present invention, during a fine color adjusting step.

With reference to the flowchart of FIG. 12, operations of the image processing apparatus 16 (see FIGS. 1 and 3) according to the second embodiment, upon carrying out fine adjustment of colors as shown in FIG. 4 (step S3B), shall be explained.

First, concerning steps S31B through S34B, since the operations are the same as those of steps S31A through S34A (see FIG. 5), explanations of such operations is omitted.

Next, by carrying out colorimetric measurements on the color chart 36c, color values of all of the color patches are acquired (step S35B).

Figure 13:
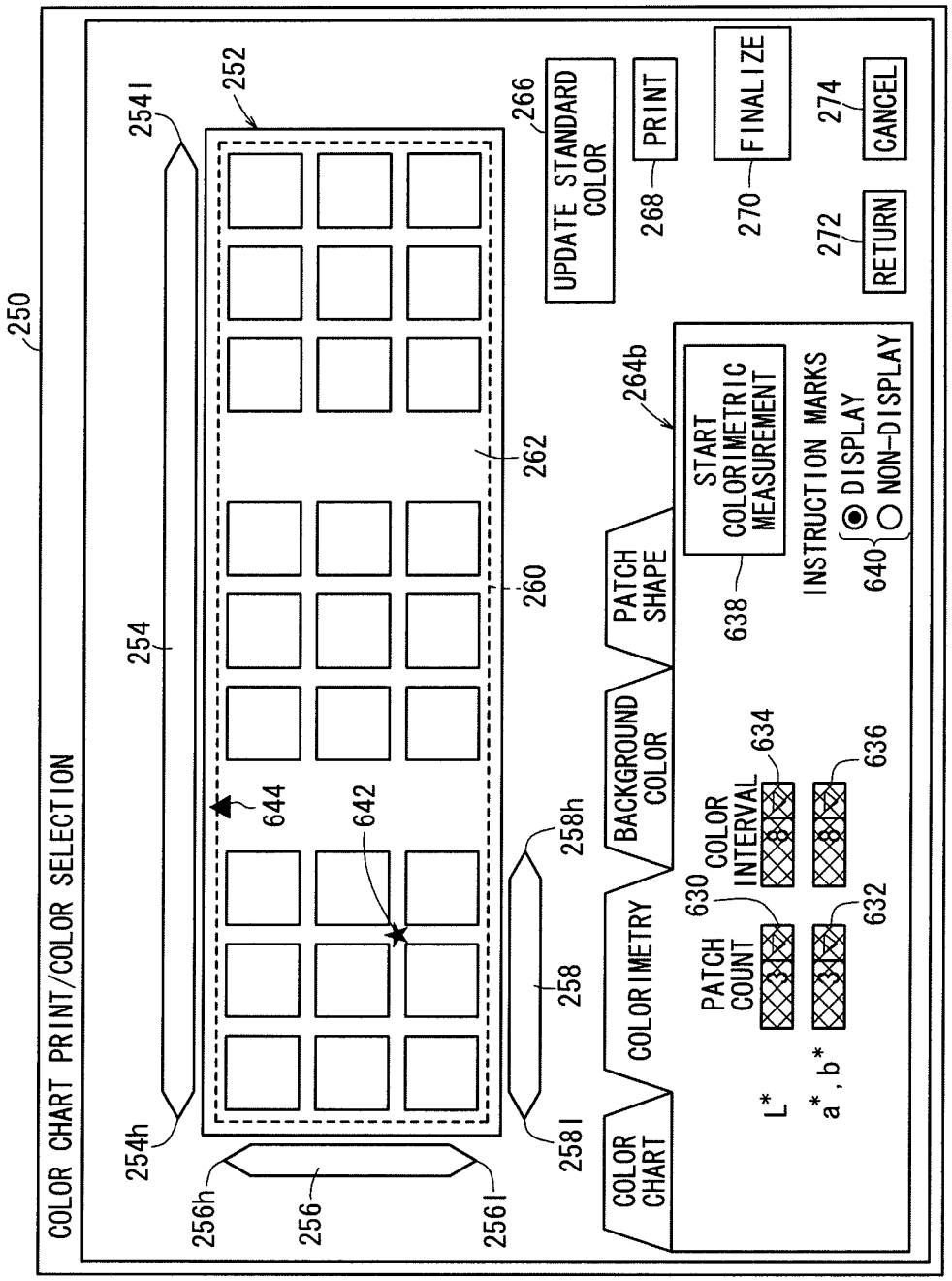
FIG. 13 is a second modified view of the color selection screen image shown in FIG. 7.

As shown in FIG. 13, in response to clicking on a given tab, a setting field 264b is displayed anew by the display device 24, the display content of which differs from the setting field 264 (see FIG. 7).

In the setting field 264b, there are provided four passive pull down menus 630, 632, 634, 636, a button 638 labeled "START COLORIMETRIC MEASUREMENT", and a pair of radio buttons 640.

Responsive to the operator clicking on the "START COLORIMETRIC MEASUREMENT" button 638, the colorimeter 20 begins taking colorimetric measurements of the color patches 38. Colorimetric measurements of the color patches 38 and acquisition of color values are repeated until color values for all of the color patches 38 have been acquired (steps S36B and S37B).

Colorimetric measurements of color patches 38 may be carried out automatically by relatively moving either one of the colorimeter 20 or the color chart 36c as the object to be colorimetrically measured. For example, profile data are acquired for each column along vertical directions of the color chart 36c of FIG. 2A, and by analyzing such profile data, color values for each of the color patches 38 may be acquired. In this case, the order in which the color patches 38 are colorimetrically measured is preferably determined beforehand.

Furthermore, each of the color patches 38 may be measured by manually moving the color chart 36c. In this case, termination of colorimetric measurements may be detected corresponding to the number of measurements made. Furthermore, color values of each of the color patches 38 may be acquired using known image analysis techniques, and by reading a two-dimensional image of the color chart 36c through a non-illustrated scanner apparatus.

Next, the display controller 54 causes a guide to be displayed indicating the corresponding position of the designated color on the display device 24 (step S38B).

Below, operations of the color selection display data generator 90B upon generation of display data corresponding to the chart simulating image 252 shall be explained with reference to the detailed block diagram of FIG. 14. Content that has already been explained concerning the aforementioned steps S33A and S36A is omitted.

Figure 14:
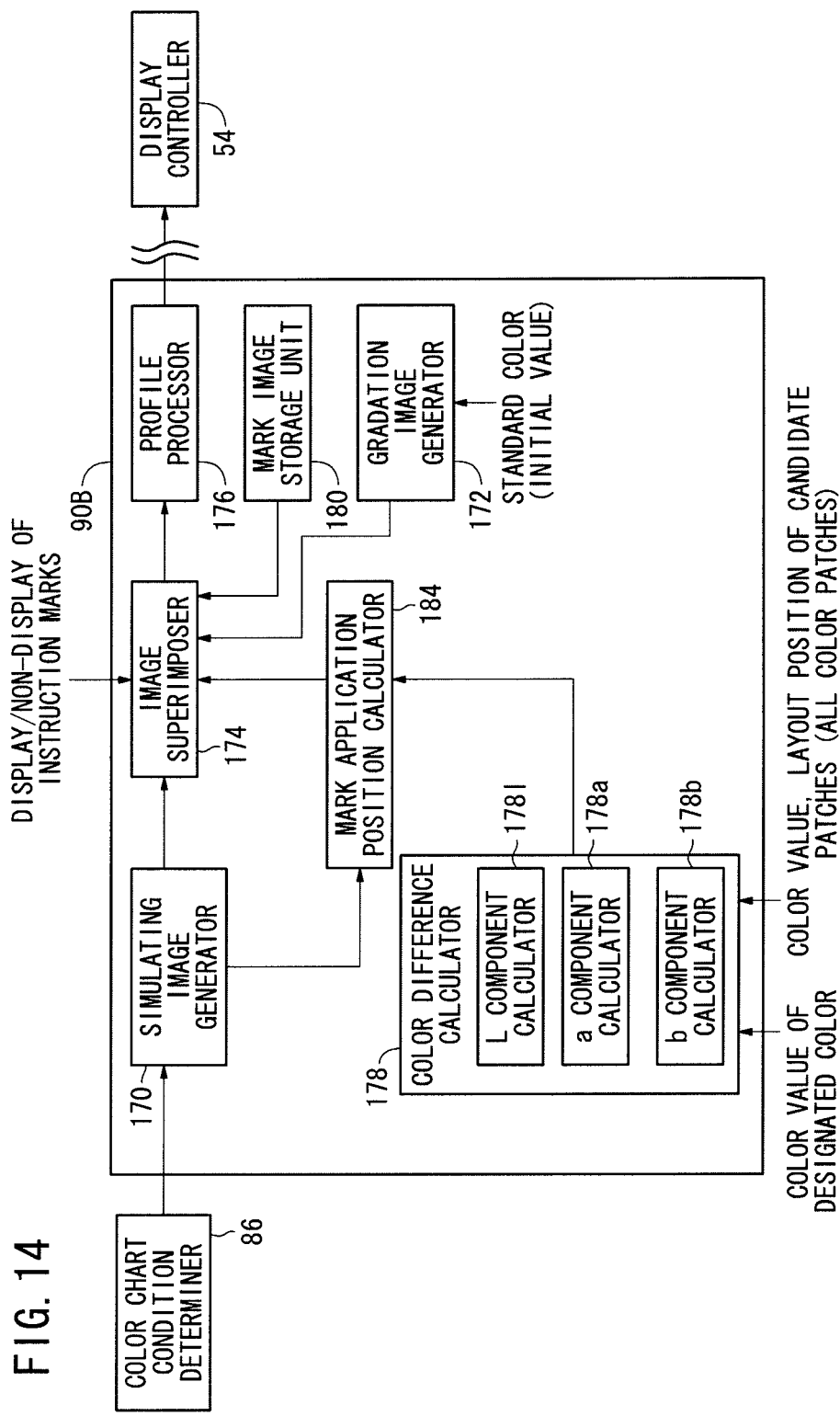
FIG. 14 is a detailed block diagram of a color selection display data generator according to the second embodiment.

As shown in FIG. 14, the color selection display data generator 90B (see FIG. 3) is equipped with the aforementioned simulating image generator 170, gradation image generator 172, image superimposer 174, profile processor 176, color difference calculator 178, and mark image storage unit 180. In addition thereto, the color selection display data generator 90B is further equipped with a mark application position calculator (corresponding position calculator) 184, which calculates positions (address data) at which instruction mark images 642, 644 (see FIG. 13; details thereof shall be discussed later) are added or applied to the chart simulating image 252.

The simulating image generator 170 generates the chart simulating image 252, based on color chart conditions acquired from the color chart condition determiner 86. In addition, the gradation image generator 172 generates the color bars 254 etc., that match the tendency of the color change corresponding to the layout of the color patches 38.

The color difference calculator 178 calculates the color difference between the color values of the designated color acquired from the memory 58 and the color values of the candidate patch acquired from the colorimeter 20. In the second embodiment, all twenty-seven color patches 38 correspond to and are treated as candidate patches.

In addition, based on the color association acquired from the simulating image generator 170, and the color values of the candidate patches and the difference values of each of the color components acquired from the color difference calculator 178, the mark application position calculator 184 determines corresponding positions on the color chart 36c responsive to the color values of the designated color. Stated otherwise, the mark application position calculator 184 generates address data that points to the aforementioned corresponding positions, and which is applied to the chart simulating image 252.

The image superimposer 174 superimposes the chart simulating image 252 acquired from the simulating image generator 170, the color bars 254 etc., acquired from the gradation image generator 172, and the instruction mark images 642 etc. acquired from the mark image storage unit 180. The image superimposer 174 superimposes the instruction mark images 642 etc., at predetermined positions on the chart simulating image 252, according to the address data acquired from the mark application position calculator 184. Further, the image superimposer 174 selects whether or not to superimpose the instruction mark images 642 etc., depending on set values entered from the input device 26.

Then, the profile processor 176 performs a profile process, which is suitable for the display device 24 to be used, on the superimposed image data acquired from the image superimposer 174, thereby producing display data. More specifically, the profile processor 176 converts the superimposed image data from device-independent data (e.g., L*, a*, b* values) into device-dependent data (e.g., R, G, B values).

Finally, the display controller 54 outputs the display data acquired from the profile processor 176 via the I/F 70 to the display device 24, and controls the display device 24 to display the color selection screen image 250 (chart simulating image 252) of FIG. 13.

In this manner, in the color selection screen image 250, in accordance with the colorimetric measurement results of the color patches 38, instruction mark images 642 etc., are updated and displayed immediately (step S38B) at corresponding positions on the color chart 36c (chart simulating image 252) responsive to the color value of the designated color.

As shown in FIG. 13, on the lefthand portion of the chart simulating image 252, in the event that a (star shaped) instruction mark image 642 is displayed, the designated color is suggested to exist at an intermediate position among four color patches 38. The four color patches 38 are defined as color patches 38 for which [1] the row number 40 is (0) and the column number 42 is (0'), [2] the row number 40 is (0) and the column number 42 is (−1'), [3] the row number 40 is (−1) and the column number 42 is (0'), and [4] the row number 40 is (−1) and the column number 42 is (−1'). In relation thereto, by resetting the color values of the standard color to the color values of the indicated position of the instruction mark image 642, it becomes easy for the operator to select a color patch 38, which is closer to the designated color on the color chart 36c that is printed next.

Further, if a (triangular shaped) instruction mark image 644 is displayed in an upper portion of the chart simulating image 252, the designated color is suggested to belong outside of the presentation range of the present color chart 36c. More specifically, the operator can grasp therefrom that the b* value of the designated color is greater than the upper limit value $(b^*_0+\Delta b^*)$ of the presentation range of the color by the color patches 38. In relation thereto, by resetting the b* value of the standard color to a value such that 12 (1.5×Δb*) is added thereto, it becomes easy for the operator to select a color patch 38, which is closer to the designated color on the color chart 36c that is printed next.

Responsive to a clicking operation on the pair of radio buttons 640, the display controller 54 either displays the instruction mark images 642 etc., or leaves the instruction mark images 642 etc., undisplayed.

In this manner, because the color values of the candidate patches are acquired in association with the positions at which the candidate patches are disposed on the color chart 36c, the corresponding position on the color chart 36c depending on the color values of the designated color can be grasped precisely.

Further, because the instruction mark images 642, 644 are images (in the example of FIG. 13, star shaped or triangular shaped images) indicative of a range within which the corresponding position exists on the color chart 36c dependent on the color value of the designated color, and the instruction mark images 642, 644 are displayed in a superimposed manner on the chart simulating image 252, the operator is capable of easily grasping at a glance the position of the color patch 38 that should be selected.

Furthermore, if the designated color is a color that is outside of the range of the gamut or is in the vicinity of a border, all of the color patches 38 are measured colorimetrically, and compared and evaluated with the color value of the designated color, whereby an appropriate color patch 38 can be selected highly efficiently.

First through third modifications of the aforementioned second embodiment shall be described below with reference to FIGS. 15 through 17.

Figure 15:
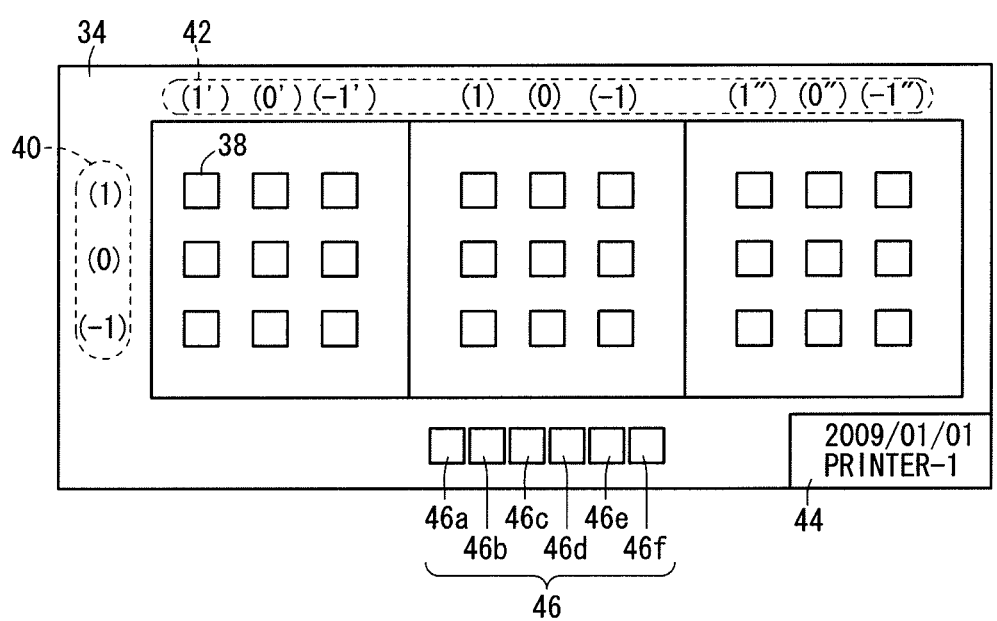
FIG. 15 is a schematic front elevational view of a color chart according to a first modified example of the second embodiment.

FIG. 15 is a schematic front elevational view of a color chart 36cA according to a first modified example of the second embodiment. In addition to the configuration of the color chart 36c shown in FIG. 2, the color chart 36cA further comprises six colorimetric measurement patches 46. The colorimetric measurement patches 46 are constituted from individual colorimetric measurement patches 46a through 46f, which are arranged in order from the left on a straight line (in a direction from left to right).

The colorimetric measurement patch 46a has a color which is the same as the color of the color patch 38 at row number 40 (0) and column number 42 (0'). The colorimetric measurement patch 46b has a color which is the same as the color of the color patch 38 at row number 40 (0) and column number 42 (0"). The colorimetric measurement patch 46c has a color which is the same as the color of the color patch 38 at row number 40 (0) and column number 42 (1). The colorimetric measurement patch 46d has a color which is the same as the color of the color patch 38 at row number 40 (0) and column number 42 (−1). The colorimetric measurement patch 46e has a color which is the same as the color of the color patch 38 at row number 40 (−1) and column number 42 (0). The colorimetric measurement patch 46f has a color which is the same as the color of the color patch 38 at row number 40 (1) and column number 42 (0).

Figure 16:
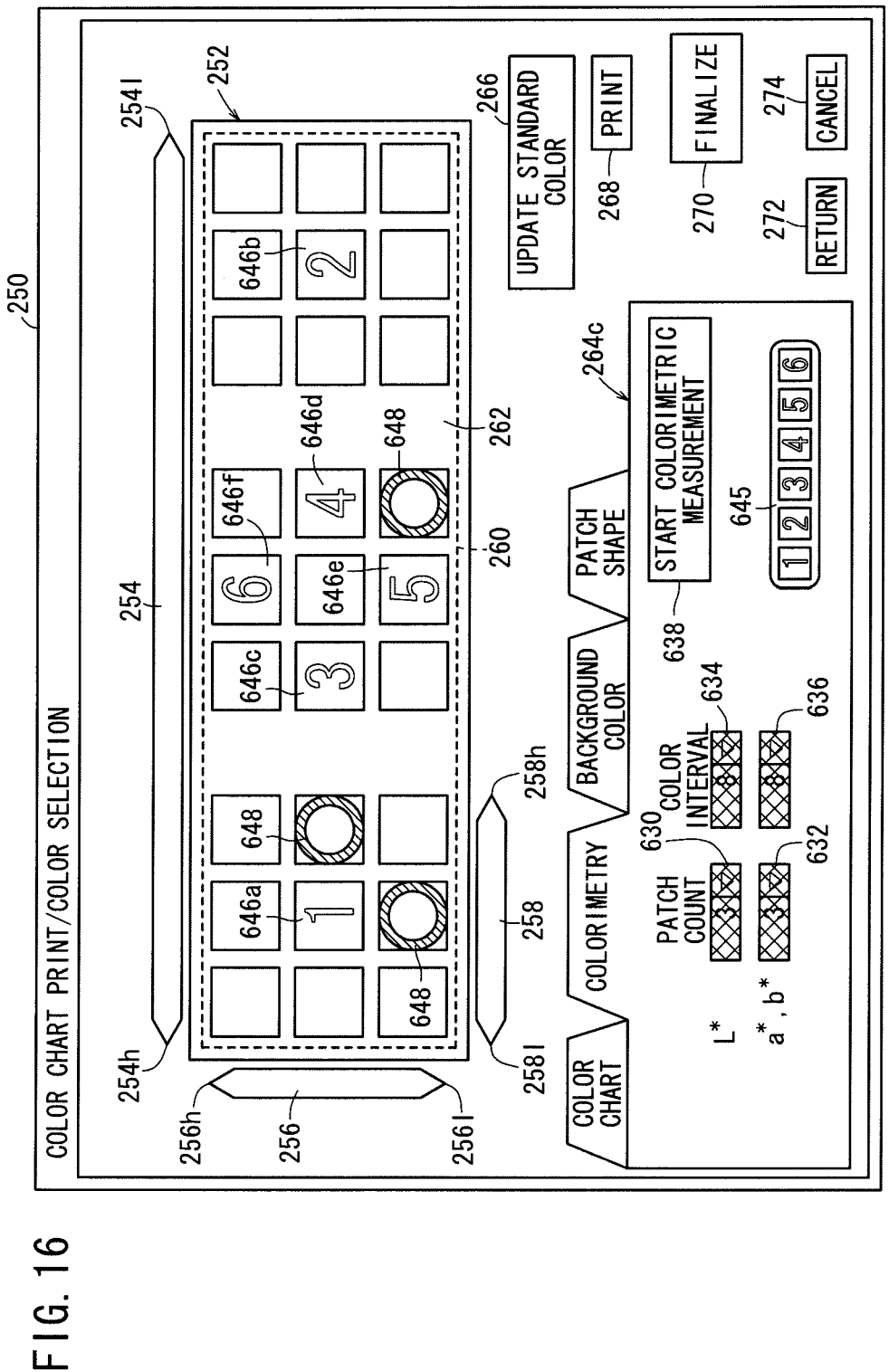
FIG. 16 is a view showing a modified example of the color selection screen image of FIG. 13.

FIG. 16 is a view showing a first modified example of the color selection screen image 250 of FIG. 13.

A setting field 264c is configured substantially the same as the setting field 264b of FIG. 13, except that an illustration image 645 is provided in place of the pair of radio buttons 640, and in this manner, the setting field 264c differs in configuration from the setting field 264b.

Six individual rectangular marks are provided in the illustration image 645. In order from the left, Arabic numerals 1 through 6 are displayed respectively in the rectangular marks.

On the other hand, Arabic numerals 1 through 6 are displayed together with six patch images 646a through 646f provided in the chart simulating image 252. Additionally, each of the colors of the patch images 646a through 646f correspond respectively with the colors of the colorimetric measurement patches 46a through 46f of FIG. 15. Owing thereto, the operator can grasp at a glance the number of the colorimetric measurement patches 46a through 46f and the color information thereof, even if provided on the color selection screen image 250.

Colorimetric measurement of the colorimetric measurement patches 46a through 46f is performed automatically by relatively moving either the color chart 36c, which serves as the object to be colorimetrically measured, or the colorimeter 20. For example, responsive to a clicking operation of the "START COLORIMETRIC MEASUREMENT" button 638, the image processing apparatus 16 enters respective color values of the colorimetric measurement patches 46a through 46f.

If done in this manner, the mark application position calculator 184 (see FIG. 14) determines at least one color patch 38 (patch image 260) that is closest to the designated color, based on the color values of the six candidate patches. For example, if the position at which the instruction mark image 642 (see FIG. 13) is disposed corresponds to the color value of the designated color, then the mark application position calculator 184 selects three color patches 38. The three color patches are ones for which [1] the row number 40 is (0) and the column number 42 is (−1'), [2] the row number 40 is (−1) and the column number 42 is (0'), and [3] the row number 40 is (−1) and the column number 42 is (−1).

In addition, three (annular shaped) instruction mark images 648 are displayed in a superimposed manner on the patch image 260. The three instruction mark images 648 are shown in a range within which the corresponding position exists on the color chart 36c. Thus, the operator can further narrow down the color patch 38, which has a color closest to the designated color.

In this manner, because apart from the twenty-seven color patches 38, colorimetric measurement patches 46a through 46f having colors of a plurality of predetermined color patches 38 (candidate patches) are arranged on a common straight line, colorimetric measurement operations by the operator can be simplified. More specifically, the operation of moving the colorimeter 20 (or the color chart 36c) is unnecessary, and colorimetric measurements can easily be automated.

Corresponding to settings from the colorimetric measuring condition setting unit 114 (see FIG. 3), at least one of the following items (i) to (iii) can be changed, i.e., (i) the number of extracted candidate patches, (ii) the positions at which the candidate patches are disposed, and (iii) the order in which the color values of the candidate patches are acquired. Therefore, because a method of operation, which is best suited to the operator, can be customized, the system is convenient.

Figure 17:
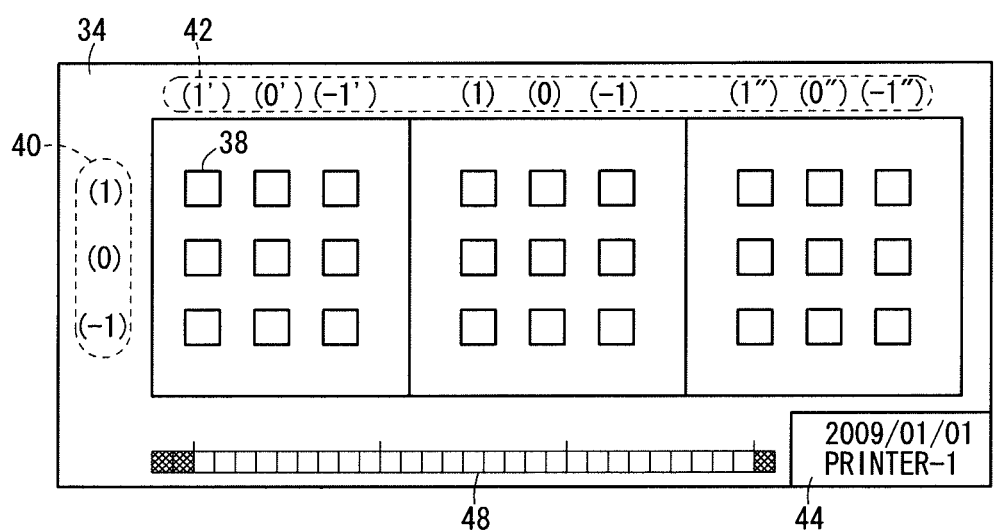
FIG. 17 is a schematic front elevational view of a color chart according to a second modified example of the second embodiment.

Next, FIG. 17 is a schematic front elevational view of a color chart 36cB according to a second modified example of the second embodiment. Similar to the color chart 36cA shown by FIG. 15, colorimetric measurement patches 48 are further provided. Among the colorimetric measurement patches 48, an entire set of colorimetric measurement patches are included, having all of the colors (e.g., twenty-seven colors in the example of FIG. 17) of the color patches 38.

By carrying out colorimetric measurement of the color chart 36cB, as described in the second embodiment, the corresponding position depending on the color values of the designated color can be indicated exactly.

Next, as a third modified example of the second embodiment, identification numbers (e.g., the row number 40 and the column number 42) of extracted candidate patches may be entered responsive to an operation performed by the operator, wherein based on such identifying information, color values of the candidate patches corresponding with layout positions thereof on the color chart 36*c* may be acquired.

In the case that color differences of adjacent color patches 38 are configured at substantially equal intervals, as in the aforementioned equations (1) through (3), upon determining the color values of the designated color, and the colorimetric values and layout positions of the candidate patches, the corresponding position of the designated color is determined uniquely.

Consequently, as shown in FIG. 9, under a condition in which an individual one of the patch images 260 (patch image 602) has been selected, by colorimetrically measuring the color patch {row number 40 (1), column number 42 (1)} corresponding to the patch image 602, color values may be acquired, which are associated with the layout position on the color chart 36*c*.

In the illustrated embodiment, the printing machine 18 comprises an inkjet printing apparatus. However, the printing machine 18 that comprises an electrophotographic printer, a thermosensitive printer, or the like may achieve advantageous effects of the present invention. The output format of the printing machine 18 is not limited to hard copies, but may be soft copies. In other words, the principles of the present invention may be applied to various image display devices or to various image display processes.

Although certain preferred embodiments of the present invention have been shown and described in detail, it should be understood that various changes and modifications may be made to the embodiment without departing from the scope of the invention as set forth in the appended claims.

What is claimed is:

1. A color selection assisting method for determining a standard color, and assisting an operator in selecting, from within a color chart that has a plurality of color patches including colors in the vicinity of the standard color, at least one color patch that is close in color to a designated color to be reproduced on a print, comprising:
    a color value acquiring step of acquiring a color value of the designated color;
    a colorimetric measuring step of colorimetrically measuring at least one color patch extracted as a candidate patch from within the color chart, and acquiring a color value of the candidate patch;
    a calculation step of calculating, based on the acquired color value of the designated color and the acquired color value of the candidate patch, a corresponding position on the color chart corresponding to the color value of the designated color;
    a displaying step of displaying respectively, together with a simulating image in which a layout of the plurality of color patches on the color chart is simulated, an instruction mark image indicative of the calculated corresponding position; and
    a modifying step of modifying at least one of:
    number of the extracted candidate patches;
    a position at which one of the candidate patches is disposed; and
    an order in which the color values of the candidate patches are acquired.

2. The color selection assisting method according to claim 1, wherein the displaying step classifies respective color components of the color value, and displays the instruction mark images respectively therefor.

3. The color selection assisting method according to claim 1, wherein the instruction mark image is an image showing a direction from a position at which the candidate patch is disposed to the corresponding position.

4. The color selection assisting method according to claim 1, wherein the colorimetric measuring step further comprises acquiring the color value of the candidate patch corresponding with the position at which the candidate patch is disposed on the color chart.

5. The color selection assisting method according to claim 4, wherein:
    the instruction mark image is an image showing a range within which the corresponding position exists; and
    the displaying step superimposes the instruction mark image on the simulating image.

6. The color selection assisting method according to claim 4, wherein a plurality of measurement patches, which are arranged on a common line and having colors of a plurality of predetermined candidate patches, are provided on the color chart.

7. The color selection assisting method according to claim 4, further comprising:
    an inputting step of inputting, responsive to an operation of the operator, identification information of the extracted candidate patch,
    wherein, based on the input identification information, the colorimetric measuring step further comprises acquiring the color value of the candidate patch corresponding with the position at which the candidate patch is disposed on the color chart.

8. The color selection assisting method according to claim 1, wherein the color value acquiring step acquires the color value of the designated color using a colorimeter, which is the same as the colorimeter used in the colorimetric measuring step.

9. The color selection assisting method according to claim 1, further comprising a step of acquiring a selected color value, which is a color value corresponding to the color patch selected as representing a color that is closest to the designated color.

10. An image processing method comprising:
    a printing step of printing a color chart that has a plurality of color patches including colors in the vicinity of the standard color;
    a colorimetric measuring step of colorimetrically measuring at least one color patch extracted as a candidate patch from within the color chart, and acquiring a color value of the candidate patch;
    a calculation step of calculating, based on a color value of a designated color to be reproduced on a print and the color value of the candidate patch, a corresponding position on the color chart corresponding to the color value of the designated color; and
    a displaying step of displaying respectively, together with a simulating image in which a layout of the plurality of color patches on the color chart is simulated, an instruction mark image indicative of the calculated corresponding position;
    an acquiring step of acquiring a selected color value, which is a color value corresponding to a color patch selected as representing a color that is closest to the designated color;

a color adjusting step of adjusting a color of the print to be printed, based on the acquired selected color value and the color value of the designated color; and a modifying step of modifying at least one of:

number of the extracted candidate patches;

a position at which one of the candidate patches is disposed; and an order in which the color values of the candidate patches are acquired.

11. A color selection assisting apparatus for determining a standard color, and assisting an operator in selecting, from within a color chart that has a plurality of color patches including colors in the vicinity of the standard color, at least one color patch that is close in color to a designated color to be reproduced on a print, comprising:

a colorimeter for colorimetrically measuring at least one color patch extracted as a candidate patch from within the color chart, and acquiring a color value of the candidate patch;

a corresponding position calculator for calculating, based on a color value of the designated color and the color value of the candidate patch acquired by the colorimeter, a corresponding position on the color chart corresponding to the color value of the designated color;

a display unit for displaying respectively, together with a simulating image in which a layout of the plurality of color patches on the color chart is simulated, an instruction mark image indicative of the corresponding position calculated by the corresponding position calculator; and a modifier that modifies at least one of:

number of the extracted candidate patches;

a position at which one of the candidate patches is disposed; and an order in which the color values of the candidate patches are acquired.

12. The color selection assisting apparatus according to claim 11, further comprising:

a selected color value acquirer for acquiring a selected color value, which is a color value corresponding to a color patch selected as representing a color that is closest to the designated color, wherein the display unit displays color information related to the selected color value acquired by the selected color value acquirer.

13. The color selection assisting apparatus according to claim 12, further comprising:

a data converter for converting the selected color value into device-dependent data for a printing machine that prints the print, using a profile of the printing machine, wherein the display unit displays the device-dependent data converted by the data converter.

14. An image processing apparatus for determining a standard color, and assisting an operator in selecting, from within a color chart that has a plurality of color patches including colors in the vicinity of the standard color, at least one color patch that is close in color to a designated color to be reproduced on a print, comprising:

a colorimeter for colorimetrically measuring at least one color patch extracted as a candidate patch from within the color chart, and acquiring a color value of the candidate patch;

a corresponding position calculator for calculating, based on a color value of the designated color and the color value of the candidate patch acquired by the colorimeter, a corresponding position on the color chart corresponding to the color value of the designated color;

a display unit for displaying respectively, together with a simulating image in which a layout of the plurality of color patches on the color chart is simulated, an instruction mark image indicative of the corresponding position calculated by the corresponding position calculator;

a first color value acquirer for acquiring a first color value, which is a color value corresponding to a color patch selected as representing a color that is closest to the designated color;

a second color value acquirer for acquiring a second color value, which is a color value of the designated color;

a print color adjuster for adjusting a color of the print to be printed, based on the first color value acquired by the first color value acquirer and the second color value acquired by the second color value acquirer; and a modifier that modifies at least one of:

number of the extracted candidate patches;

a position at which one of the candidate patches is disposed; and an order in which the color values of the candidate patches are acquired.

15. A non-transitory computer readable medium storing therein a program for determining a standard color, and assisting an operator in selecting, from within a color chart that has a plurality of color patches including colors in the vicinity of the standard color, at least one color patch that is close in color to a designated color to be reproduced on a print, the program enabling a computer to function as:

a color value acquirer for acquiring a color value of the designated color;

a corresponding position calculator for calculating a corresponding position on the color chart corresponding to the color value of the designated color, based on a color value of a candidate patch obtained by colorimetrically measuring at least one color patch extracted as the candidate patch from within the color chart, and the color value of the designated color acquired by the color value acquirer;

a display controller for displaying respectively, together with a simulating image in which a layout of the plurality of color patches on the color chart is simulated, an instruction mark image indicative of the corresponding position calculated by the corresponding position calculator; and a modifier that modifiers at least one of:

number of the extracted candidate patches;

a position at which one of the candidate patches is disposed; and an order in which the color values of the candidate patches are acquired.

* * * * *